(12) United States Patent
Kuo et al.

(10) Patent No.: US 8,189,158 B1
(45) Date of Patent: May 29, 2012

(54) FRINGE FIELD SWITCHING LIQUID CRYSTAL DISPLAY APPARATUS

(75) Inventors: Feng-Wei Kuo, Pingtung County (TW);
Ko-Ruay Jen, Taipei (TW);
Guang-Shiung Chao, Kaohsiung County (TW); Chia-Hua Yu, Taipei County (TW); I-Fang Wang, Changhua County (TW)

(73) Assignee: HannStar Display Corp., New Taipei (TW)

( * ) Notice: Subject to any disclaimer, the term of this patent is extended or adjusted under 35 U.S.C. 154(b) by 0 days.

(21) Appl. No.: 13/248,983

(22) Filed: Sep. 29, 2011

(51) Int. Cl.
*G02F 1/1343* (2006.01)

(52) U.S. Cl. ........................................................ 349/141

(58) Field of Classification Search .................. None
See application file for complete search history.

(56) References Cited

U.S. PATENT DOCUMENTS

| | | | |
|---|---|---|---|
| 6,233,034 B1 | 5/2001 | Lee et al. | |
| 6,449,026 B1 | 9/2002 | Min et al. | |
| 6,466,290 B2 | 10/2002 | Kim et al. | |
| 6,522,380 B2 | 2/2003 | Lee et al. | |
| 6,580,487 B1* | 6/2003 | Kim et al. | 349/141 |
| 6,747,712 B2 | 6/2004 | Noh et al. | |
| 7,199,850 B2 | 4/2007 | Jun | |
| 7,212,270 B2 | 5/2007 | Takatori et al. | |
| 7,471,364 B2 | 12/2008 | Park et al. | |
| 7,755,723 B2 | 7/2010 | Ino | |
| 7,760,304 B2 | 7/2010 | Sekime | |
| 7,812,893 B2 | 10/2010 | Yagi et al. | |
| 7,903,219 B2 | 3/2011 | Sakurai et al. | |
| 7,982,840 B2 | 7/2011 | Segawa et al. | |
| 7,995,168 B2 | 8/2011 | Nishimura et al. | |
| 7,999,899 B1 | 8/2011 | Yu et al. | |
| 2006/0215101 A1* | 9/2006 | Yamazaki et al. | 349/143 |
| 2007/0070266 A1 | 3/2007 | Ochiai et al. | |
| 2007/0171319 A1 | 7/2007 | Fujita et al. | |
| 2008/0068523 A1 | 3/2008 | Mitsui et al. | |
| 2008/0225217 A1 | 9/2008 | Wakabayashi | |
| 2009/0108259 A1 | 4/2009 | Lin et al. | |
| 2010/0007834 A1 | 1/2010 | Song et al. | |
| 2010/0007837 A1 | 1/2010 | Ham et al. | |
| 2010/0079712 A1 | 4/2010 | Tanaka et al. | |
| 2010/0259703 A1 | 10/2010 | Song | |

FOREIGN PATENT DOCUMENTS

| | | |
|---|---|---|
| EP | 1 229 378 | 8/2002 |
| EP | 1 970 752 | 3/2008 |

OTHER PUBLICATIONS

Youn et al., "Optimal pixel design for low driving, single gamma curve and single cell-gap transflective fringe-field switching liquid crystal display," *Liquid Crystals*, vol. 35, No. 2, Feb. 2008, pp. 187-194.

* cited by examiner

*Primary Examiner* — Thanh-Nhan P. Nguyen
(74) *Attorney, Agent, or Firm* — Volpe and Koenig, P.C.

(57) ABSTRACT

A fringe field switching liquid crystal display apparatus is provided. This apparatus includes a first electrode and a second electrode. The first electrode includes a first side edge, a second side edge and plural strips defining plural spacings between the first and the second side edges. Each of the plural strips is formed between two of the plural spacings, and each of the plural spacings has two ends. The second electrode is disposed in a stacked relationship with the first electrode, and includes at least a penetrating vacancy with a projection, which overlaps one of the two ends of one of the plural spacings.

19 Claims, 21 Drawing Sheets

FRINGE FIELD SWITCHING LIQUID CRYSTAL DISPLAY APPARATUS

FIELD OF THE INVENTION

The present invention relates to a liquid crystal display apparatus, especially to a fringe field switching liquid crystal display apparatus.

BACKGROUND OF THE INVENTION

Currently the liquid crystal displays (LCDs) have been dominating in almost all the major display markets for several applications, such as monitors, mobile phones, televisions, notebook computers, tablet personal computers (PCs), global positioning system (GPS) devices, portable video players, as the technologies of the LCD have been developing widely, deeply and quickly.

The liquid crystals play the role of light valves to control the light transmission and the light blocking at instantaneous display time in each pixel of the LCD. In the view of the control mechanisms of the liquid crystals, the LCD can be divided into the types of the vertical alignment (VA) and the plane switching.

The VA type can be further divided into several sub-types. Generally, the VA type LCD has very fast response time for the liquid crystals, and is especially suitable for displaying the video showing very fast movements. However, when the user presses the LCD screen by fingers or other objects, the vortex-shaped pattern appears at the place being pressed on the screen of the LCD, because the distance interval of the vertical alignment of the liquid crystals is shortened by such vertically pressing on the screen. In this aspect, the VA LCD is not suitable to be used for the touch-panel display, since the screen of the touch-panel display tends to be frequently touched and pressed by the user's finger, and the displayed picture thereof will be blurred at anywhere is being touched.

On the other hand, the plane switching type LCDs, including the in-plane switching (IPS) and the fringe field switching (FFS) LCDs, do not have this kind of problem, and provide good performance for the touch-panel display, since the liquid crystal alignments thereof occur in the plane (horizontal) direction rather than the vertical direction. Generally, FFS LCD has larger aperture ratio and transmittance than those of IPS LCD, and makes itself as a good candidate for the portable touch-panel display. However, the charging time for the counter electrode in each pixel of the typical FFS LCD is not short enough, and results in the long response time.

Refer to FIG. 1A, which shows a top view of a pixel in a conventional FFS LCD of the prior art. In FIG. 1A, the pixel electrode 11 includes plural slits 111 and plural strips 112, while the counter electrode 12 is a plane electrode. The pixel electrode 11 is disposed right above the counter electrode 12, where the electrical field directions in this pixel from the top view are shown by arrows, and are usually from the slits 111 to the strips 112, that is, the transverse directions, from right to left or form left to right. FIG. 1B shows a cross section view of the pixel in FIG. 1A along dash line A-A, where the electrical field directions from this cross section view are shown by arrows. Basically, the pixel electrode 11 can be positively or negatively charged. The pixel electrode is positively charged, when the counter electrode is negatively charged, and vice versa, so as to create the electrical fields. FIG. 1C is an enlarged view on the area encircled by the dash line in FIG. 1A. It can be seen from FIG. 1C that the electrical field directions at the ends of the slits are no longer in the transverse directions shown in FIG. 1A due to the top boundary of the pixel electrode 11, since the electrical field is created from the positively charged area, e.g. counter electrode 12, to the negatively charged area, e.g. pixel electrode 11, which includes several strips 112 and top and bottom boundaries. This non-uniformity of the electrical fields on the two ends of each slit causes the dark lines (dark stripes) at each end of the slits when the pixel is in turn-on condition. This problem results in lowering the maximum brightness and the contrast ratio, and consequently energy waste and poor displayer performance.

For overcoming the above-mentioned problem existing in the conventional techniques, the novel FFS LCD apparatuses are provided in the present invention to solve the above problem and to provide excellent display performance.

SUMMARY OF THE INVENTION

The present invention provides the FFS LCD apparatuses.

In accordance with one aspect of the present invention, a fringe field switching (FFS) liquid crystal display (LCD) apparatus is provided. This apparatus includes a first electrode and a second electrode. The first electrode includes a first side edge, a second side edge and plural strips defining plural spacings between the first and the second side edges, wherein each of the plural strips is formed between two of the plural spacings, and each of the plural spacings has two ends. The second electrode is disposed in a stacked relationship with the first electrode, and includes at least a penetrating vacancy having a projection overlapping one of the two ends of one of the plural spacings.

In accordance with another aspect of the present invention, an FFS LCD apparatus is provided. This apparatus includes a first electrode and a second electrode. The first electrode includes a first side edge, a second side edge and plural strips defining plural spacings between the first and the second side edges, wherein each of the plural strips is formed between two of the plural spacings, and each of the plural spacings has two ends. The second electrode is disposed in a stacked relationship with the first electrode, and includes at least an electrical-field modifying device having a projection overlapping one of the two ends of one of the plural spacings.

In accordance with a further aspect of the present invention, an FFS LCD apparatus is provided. This apparatus includes a first electrode, a second electrode and at least an electrical-field modifying device. The first electrode includes plural spacings defining plural strips, wherein each of the plural strips is formed between two of the plural spacings, and each of the plural spacings has two ends. The second electrode is disposed in a stacked relationship with the first electrode. The electrical-field modifying device has a projection overlapping one of the two ends of one of the plural spacings.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
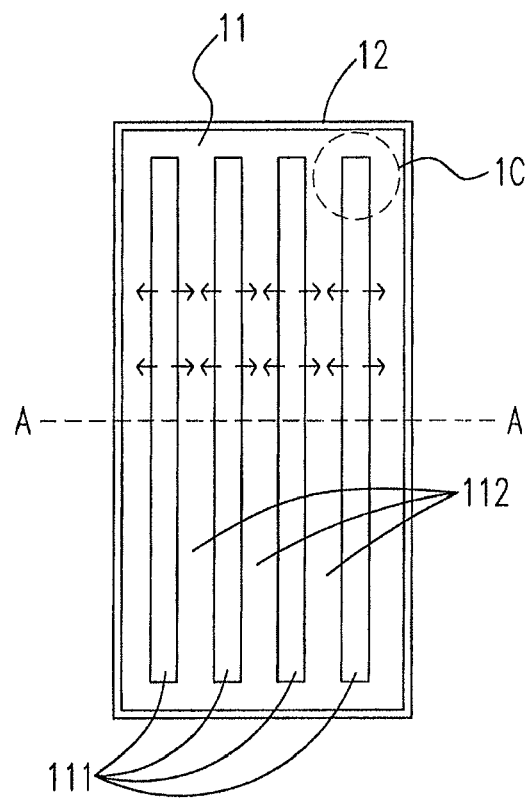
FIG. 1A is the schematic diagram showing a top view of a pixel in a conventional FFS LCD of the prior art.
Figure 1B:
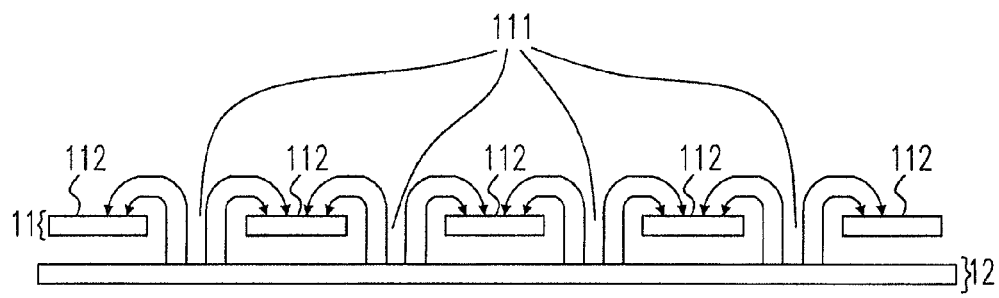
FIG. 1B is the schematic diagram showing a cross section view of the pixel in FIG. 1A along dash line A-A.
Figure 1C:
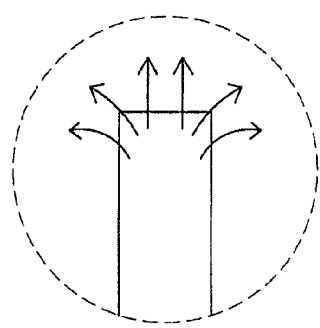
FIG. 1C is the schematic diagram showing an enlarged view on the area encircled by the dash line in FIG. 1A.
Figure 2A:
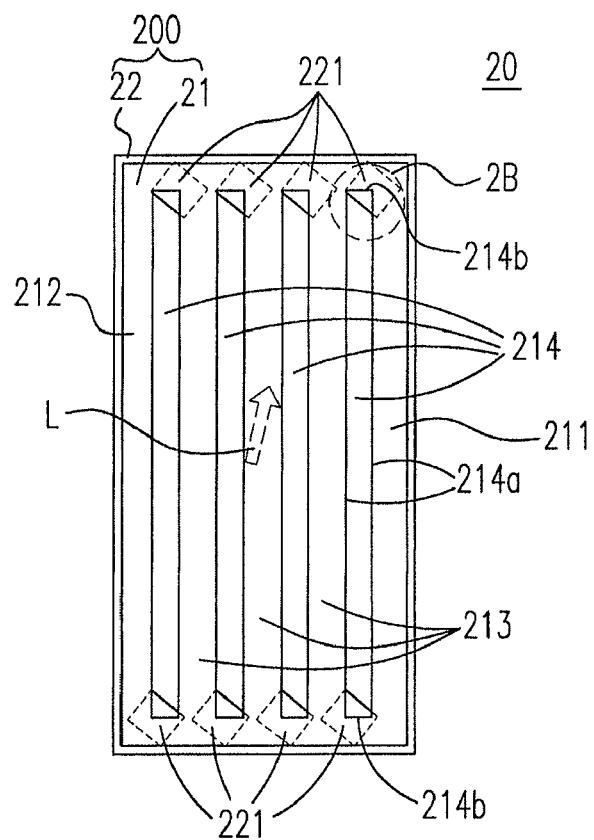
FIG. 2A is the schematic diagram showing a top view of an FFS LCD apparatus in one embodiment of the present invention.

FIG. 2A shows a top view of an FFS LCD apparatus in one embodiment of the present invention. In FIG. 2A, the FFS LCD apparatus 20 includes a first electrode 21 in a stacked relationship with a second electrode 22. In this embodiment, the first electrode 21 is disposed above the second electrode 22. In some embodiments, the first electrode 21 can be disposed below the second electrode 22. The first electrode 21 includes a first side edge 211, a second side edge 212 and plural strips 213, which define plural spacings 214, e.g. slits. Each of the plural strips 213 is formed between two of the plural spacings 214, and each of the plural spacings 214 has two ends. The second electrode 22 includes thereon at least one penetrating vacancy 221, which has a projection overlapping one of the two ends of one of the plural spacings 214. Each of the plural spacings 214 has two length edges 214a and two width edges 214b. Generally, the first 21 and the second 22 electrodes are applied with opposite electrical charges, i.e. the positive and negative electrical charges, so as to generate the electrical field between them. As described above, in the conventional FFS LCD, the electrical fields around the ends of the spacings, e.g. slits, are not uniformly oriented in the transverse direction due to the top and the bottom boundaries as shown in FIG. 1C. In contrast, in the present embodiment, since the area of the penetrating vacancy 221 cannot be electrically charged. the phenomenon of the non-uniformity in the directions of the electrical fields around the slit ends occurring in the prior art can be effectively and largely eliminated to provide the better display performance by adopting the structure of the present embodiment.

Figure 2B:
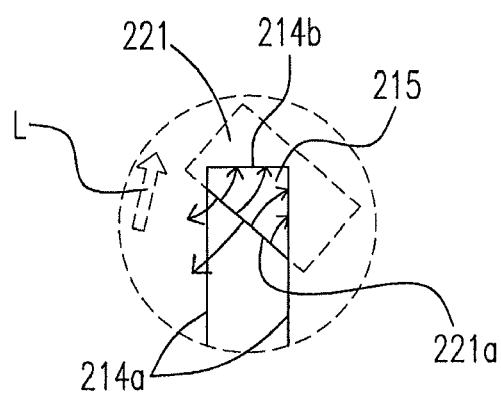
FIG. 2B is the schematic diagram showing an enlarged view on the area encircled by the dash line in FIG. 2A.

For better taking a look at the structural relationship between the penetrating vacancy 221 and the spacing 214 in details, an enlarged view on the area encircled by the dash line 2B in FIG. 2A is shown in FIG. 2B. In FIG. 2B, the penetrating vacancy 221 can optionally include a substantially straight edge 221a, i.e. a straight edge or an edge with slight curvature. The liquid crystals are disposed above the first electrode 21 and the second electrode 22, but not shown in FIG. 2A for clarity. The display device 20 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 2A and 2B. In some embodiments, the virtual arrow has a projection onto the second electrode 22, and the dark lines occurring around the ends of the slits of the first electrode due to non-uniform electrical field in the prior art can be further effectively eliminated by adopting the present embodiment to control an included angle between the substantially straight edge 221*a* and the projection of the virtual arrow L in a range of 14 to 90 degrees, preferably 30 to 60 degrees, further preferably 40 to 50 degrees, based on the design to adjust the relationship between the electrical fields at these ends of the spacings 214 and the oriented directions of the liquid crystals during the operation. In accordance with the experimental data, the above included angle around 45 degrees can provide very excellent display performance without any dark line at the ends of the spacings, e.g. slits, of the first electrode.

Figure 2C:
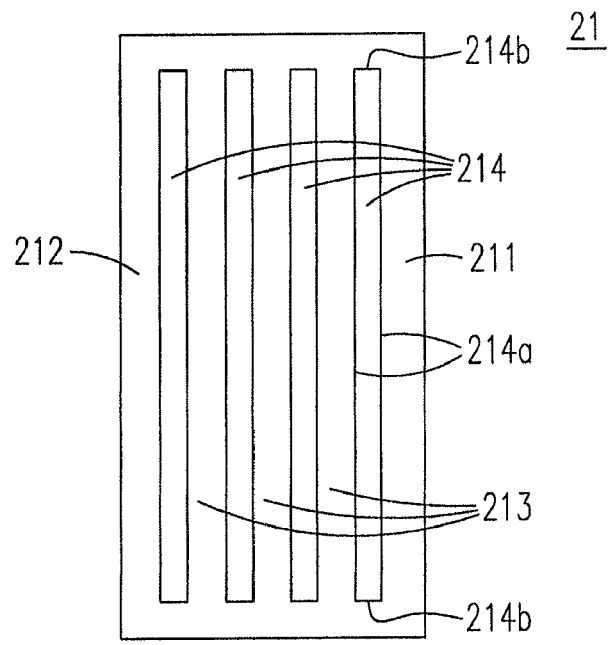
FIG. 2C is the schematic diagram showing a top view of the first electrode in the FFS LCD apparatus of FIG. 2A.
Figure 2D:
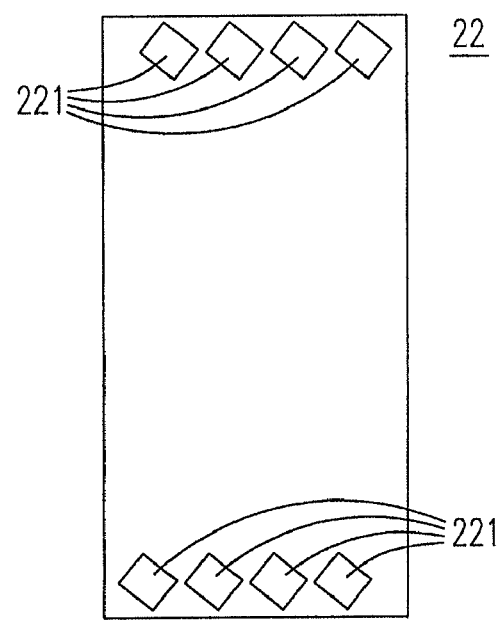
FIG. 2D is the schematic diagram showing a top view of the second electrode in the FFS LCD apparatus of FIG. 2A.

For further clear illustration, the first electrode 21 in FIG. 2A is solely shown in FIG. 2C without showing the second electrode 22; while the second electrode 22 in FIG. 2A is solely shown in FIG. 2D without showing the first electrode 21.

In the above embodiments, each of the first 21 and the second 22 electrodes can include a transparent conductive material, e.g. indium tin oxide (ITO), tin oxide, fluorine-doped tin oxide, zinc oxide, aluminum-doped zinc oxide, gallium-doped zinc oxide, etc., thereon so that the first 21 and the second 22 electrodes can be electrically charged.

In some embodiments, the substantially straight edge 221*a* forms a segment of a contour of the penetrating vacancy 221, and has a projection onto the first electrode 21 and across the two length edges 214*a* of the spacing 214 as shown in FIG. 2B.

In some embodiments, the FFS LCD apparatus 20 can include an FFS structure 200, which includes the first electrode 21 and the second electrode 22, and the penetrating vacancy 221 is formed within the FFS structure 200.

In some embodiments, the projection of the penetrating vacancy 221 overlaps one of the two ends of one of the plural spacings 214 to form an overlapped area 215, which size can be in a range of one tenth to three times of a square of the width of the spacing 214, i.e. $W^2$, where W is the width of the spacing.

Figure 2E:
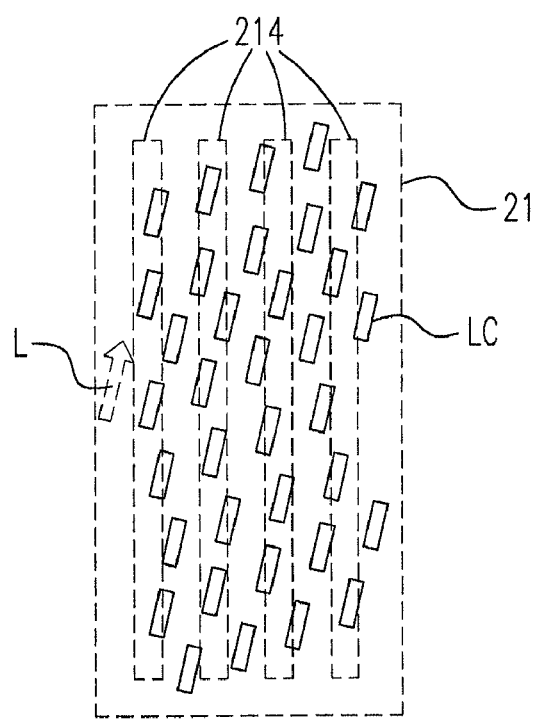
FIG. 2E is the schematic diagram showing a top view of liquid crystals and the first electrode in the FFS LCD apparatus of FIG. 2A.

FIG. 2E shows a top view of liquid crystals and the first electrode in the FFS LCD apparatus of FIG. 2A. The liquid crystals LC are disposed above the first 21 and the second 22 electrodes. Actually, there are as high as thousands of liquid crystals in each pixel. For clarity, FIG. 2E only shows the first electrode 21 and several liquid crystals, which number are much lower than the actual number, and the size of the liquid crystal LC in FIG. 2E is much larger than the actual size. Basically, the orientations of the liquid crystals LC are approximately parallel to the rubbing direction indicated by the virtual arrow L.

The shape of the penetrating vacancy in the present invention can be varied with any shape as long as the penetrating vacancy has a projection overlapping one of the two ends of the spacing. In an embodiment shown in FIG. 3A, the penetrating vacancy 321 on the second electrode 32 below the first electrode 31 has a triangular shape. The FFS LCD apparatus 30 in FIG. 3A includes a first electrode 31 in a stacked relationship with a second electrode 32. The first electrode 21 includes a first side edge 311, a second side edge 312 and plural strips 313, which define plural spacings 314, e.g. slits. Each of the plural strips 313 is formed between two of the plural spacings 314, and each of the plural spacings 314 has two ends. The second electrode 32 includes at least one the penetrating vacancy 321, which has a projection overlapping one of the two ends of one of the plural spacings 314. Each of the plural spacings 314 has two length edges 314*a* and two width edges 314*b*. Similarly, the first 31 and the second 32 electrodes are applied with opposite electrical charges so as to generate the electrical field between them. Similarly, in the present embodiment, since the area of the penetrating vacancy 321 cannot be electrically charged, the phenomenon of the non-uniformity in the directions of the electrical fields around the slit ends occurring in the prior art can be effectively and largely eliminated to provide the better display performance by adopting the structure of the present embodiment.

Figure 3A:
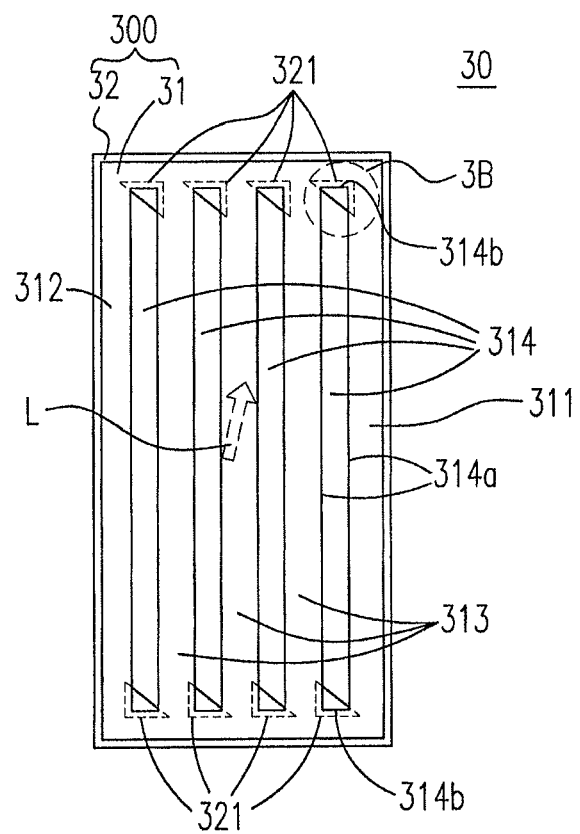
FIG. 3A is the schematic diagram showing a top view of an FFS LCD apparatus in one embodiment of the present invention.
Figure 3B:
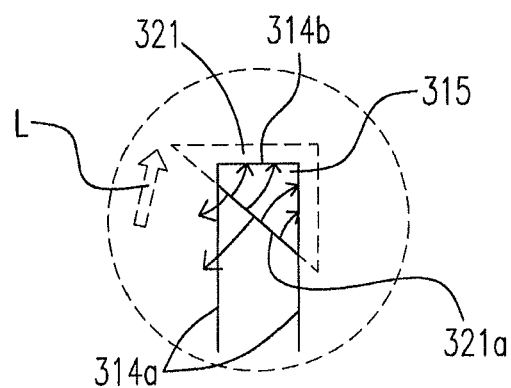
FIG. 3B is the schematic diagram showing an enlarged view on the area encircled by the dash line in FIG. 3A.

For better taking a look at the structural relationship between the penetrating vacancy 321 and the spacing 314 in details, an enlarged view on the area encircled by the dash line 3B in FIG. 3A is shown in FIG. 3B. In FIG. 3B, the penetrating vacancy 321 can optionally include a substantially straight edge 321*a*, i.e. a straight edge or an edge with slight curvature. The liquid crystals are disposed above the first electrode 31 and the second electrode 32, but not shown in FIG. 3A for clarity. The display device 30 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 3A and 3B. In some embodiments, the virtual arrow has a projection onto the second electrode 32, and the dark lines occurring around the ends of the slits of the first electrode due to non-uniform electrical field in the prior art can be further effectively eliminated by adopting the present embodiment to control an included angle between the substantially straight edge 321*a* and the projection of the virtual arrow L in a range of 14 to 90 degrees, preferably 30 to 60 degrees, further preferably 40 to 50 degrees, based on the design to adjust the relationship between the electrical fields at these ends of the spacings 314 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the substantially straight edge 321*a* forms a segment of a contour of the penetrating vacancy 321, i.e. a penetrating hole, and has a projection onto the first electrode 31 and across two length edges 314*a* of the spacing 314.

Figure 3C:
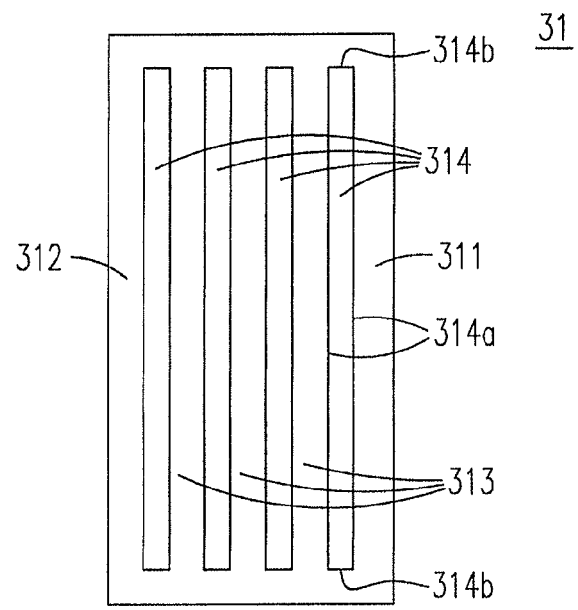
FIG. 3C is the schematic diagram showing a top view of the first electrode in the FFS LCD apparatus of FIG. 3A.
Figure 3D:
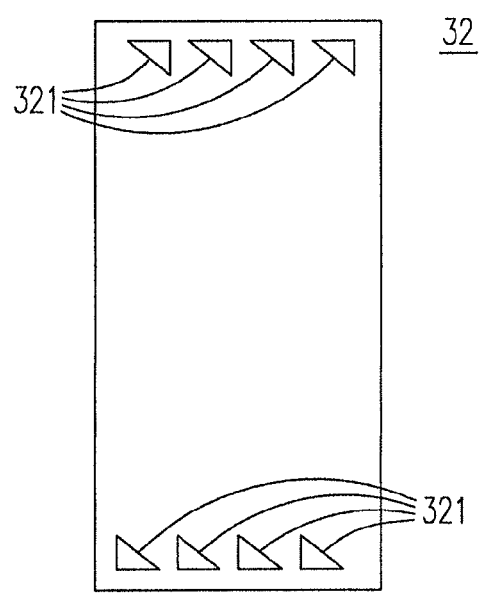
FIG. 3D is the schematic diagram showing a top view of the second electrode in the FFS LCD apparatus of FIG. 3A.

For further clear illustration, the first electrode 31 in FIG. 3A is solely shown in FIG. 3C without showing the second electrode 32; while the second electrode 32 in FIG. 3A is solely shown in FIG. 3D without showing the first electrode 31.

In some embodiments, the FFS LCD apparatus 30 can include an FFS structure 300, which includes the first electrode 31 and the second electrode 32, and the penetrating vacancy 321 is formed within the FFS structure 300.

In some embodiments, the projection of the penetrating vacancy 321 overlaps one of the two ends of one of the plural spacings 314 to form an overlapped area 315, which size can be in a range of one tenth to three times of a square of the width of the spacing 314, i.e. $W^2$, where W is the width of the spacing.

Figure 4A:
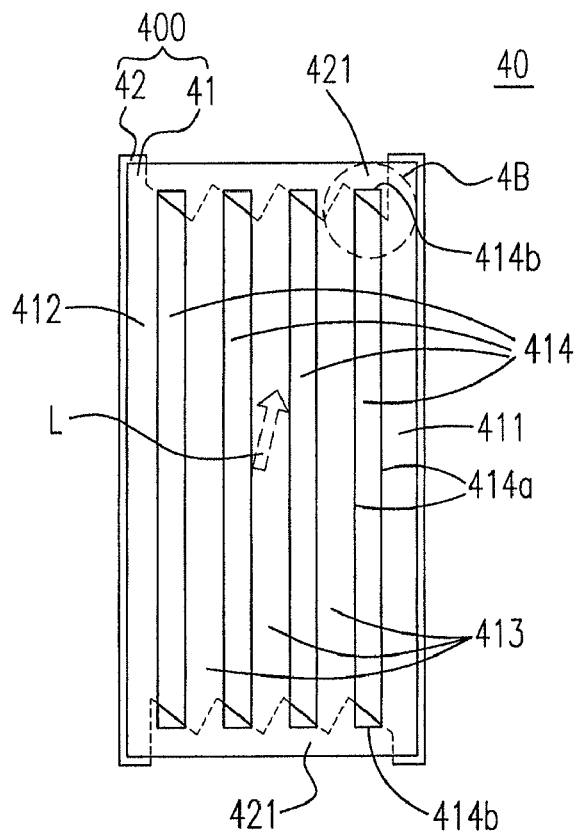
FIG. 4A is the schematic diagram showing a top view of an FFS LCD apparatus in one embodiment of the present invention.

The penetrating vacancies in the present invention can be a penetrating hole or a penetrating cutout. As shown in FIG. 4A, The FFS LCD apparatus 40 includes a first electrode 41 in a stacked relationship with a second electrode 42. The first electrode 41 includes a first side edge 411, a second side edge 412 and plural strips 413, which define plural spacings 414, e.g. slits. Each of the plural strips 413 is formed between two of the plural spacings 414, and each of the plural spacings 414, e.g. slits, has two ends. The second electrode 42 include the penetrating vacancy 421, which has a projection overlapping one of the two ends of one of the plural spacings 414. The penetrating vacancy 421 is a penetrating cutout. Each of the plural spacings 414 has two length edges 414a and two width edges 414b. Similarly, the first 41 and the second 42 electrodes are applied with opposite electrical charges so as to generate the electrical field between them. Similarly, in the present embodiment, since the area of the penetrating vacancy 421, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 4B:
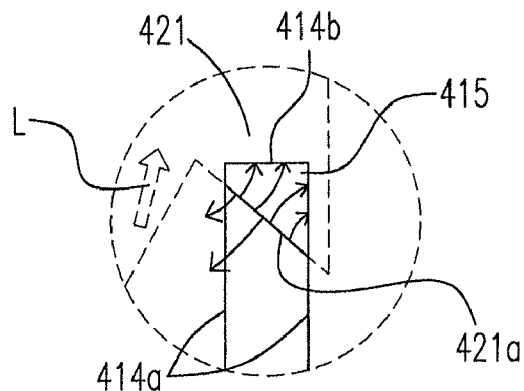
FIG. 4B is the schematic diagram showing an enlarged view on the area encircled by the dash line in FIG. 4A.

For better taking a look at the structural relationship between the penetrating vacancy 421, i.e. the penetrating cutout, and the spacing 414 in details, an enlarged view on the area encircled by the dash line 4B in FIG. 4A is shown in FIG. 4B. In FIG. 4B, the penetrating vacancy 421 can optionally include a substantially straight edge 421a, i.e. a straight edge or an edge with slight curvature. The liquid crystals are disposed above the first electrode 41 and the second electrode 42, but not shown in FIG. 4A for clarity. The display device 40 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 4A and 4B. In some embodiments, the virtual arrow has a projection onto the second electrode 42, and the dark lines occurring around the ends of the slits of the first electrode due to non-uniform electrical field in the prior art can be further effectively eliminated by adopting the present embodiment to control an included angle between the substantially straight edge 421a and the projection of the virtual arrow L in a range of 14 to 90 degrees, preferably 30 to 60 degrees, further preferably 40 to 50 degrees, based on the design to adjust the relationship between the electrical fields at these ends of the spacings 414 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the substantially straight edge 421a forms a segment of a contour of the penetrating vacancy 421, i.e. a penetrating cutout, and has a projection onto the first electrode 41 and across two length edges 414a of the spacing 414.

Figure 4C:
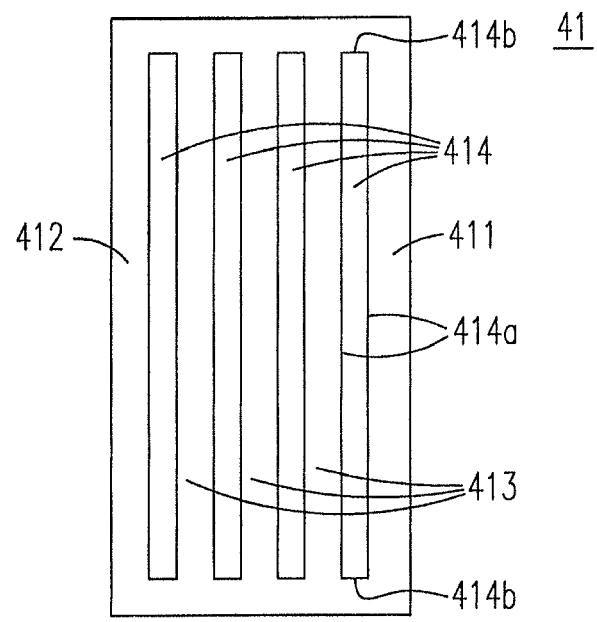
FIG. 4C is the schematic diagram showing a top view of the first electrode in the FFS LCD apparatus of FIG. 4A.
Figure 4D:
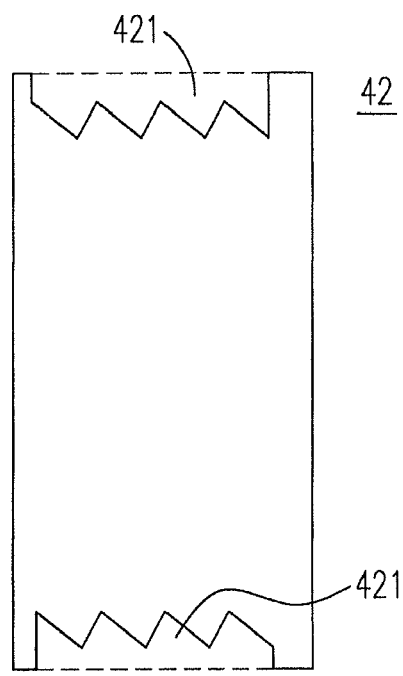
FIG. 4D is the schematic diagram showing a top view of the second electrode in the FFS LCD apparatus of FIG. 4A.

Similarly, for further clear illustration, the first electrode 41 in FIG. 4A is solely shown in FIG. 4C without showing the second electrode 42; while the second electrode 42 in FIG. 4A is solely shown in FIG. 4D without showing the first electrode 41. In FIG. 4D, the penetrating vacancy 421 is a penetrating cutout, i.e. a penetrating area, and the other area on the second electrode 42 is covered with transparent conductive materials, e.g. ITO.

In the present invention, the penetrating vacancy on the second electrode can be penetrating holes with various shapes mentioned above, and also can be penetrating cutout in some embodiments, as long as the penetrating cutout has a projection overlapping one of the two ends of the spacing on the first electrode so as to modify the electrical fields at the ends of the spacings.

In some embodiments, the FFS LCD apparatus 40 can include an FFS structure 400, which includes the first electrode 41 and the second electrode 42, and the penetrating vacancy 421 is formed within the FFS structure 400.

In some embodiments, the projection of the penetrating vacancy 421 overlaps one of the two ends of one of the plural spacings 414 to form an overlapped area 415, which size can be in a range of one tenth to three times of a square of the width of the spacing 414, i.e. $W^2$, where W is the width of the spacing.

Figure 5A:
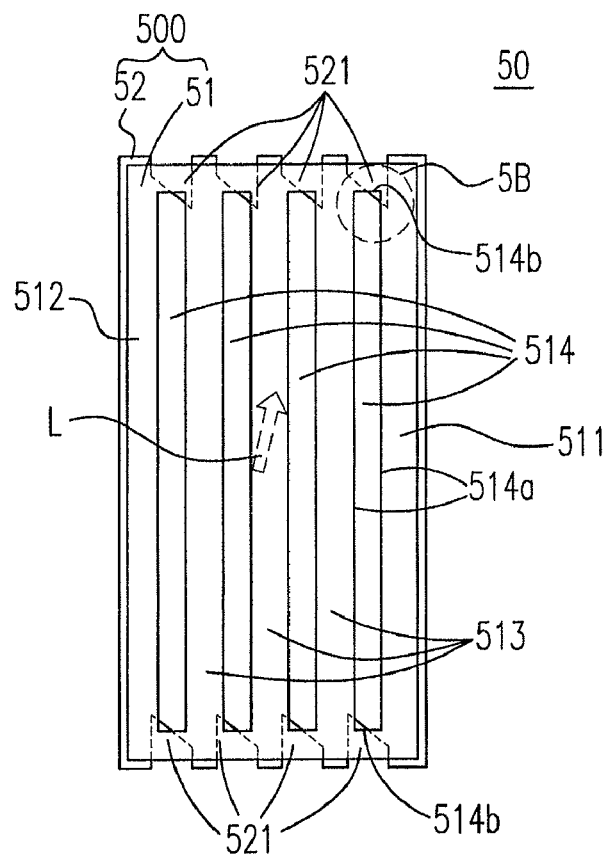
FIG. 5A is the schematic diagram showing a top view of an FFS LCD apparatus in one embodiment of the present invention.

FIG. 5A shows a top view of an FFS LCD apparatus in one embodiment of the present invention. In FIG. 5A, the FFS LCD apparatus 50 includes a first electrode 51 in a stacked relationship with a second electrode 52. The first electrode 51 includes a first side edge 511, a second side edge 512 and plural strips 513, which define plural spacings 514, e.g. slits. Each of the plural strips 513 is formed between two of the plural spacings 514, and each of the plural spacings 514, e.g. slits, has two ends. The second electrode 52 include the penetrating vacancy 521, which has a projection overlapping one of the two ends of one of the plural spacings 514. The penetrating vacancy 521 is a penetrating cutout. Each of the plural spacings 514 has two length edges 514a and two width edges 514b. Similarly, the first 51 and the second 52 electrodes are applied with opposite electrical charges so as to generate the electrical field between them. Similarly, in the present embodiment, since the area of the penetrating vacancy 521, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 5B:
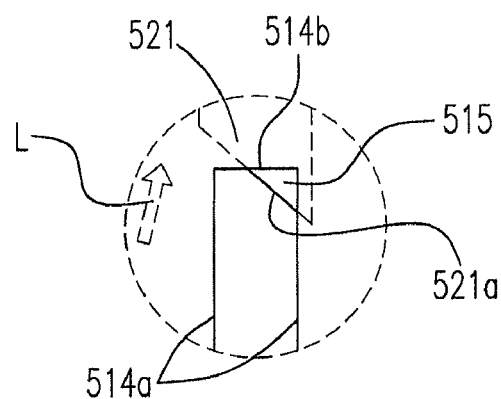
FIG. 5B is the schematic diagram showing an enlarged view on the area encircled by the dash line in FIG. 5A.

For better taking a look at the structural relationship between the penetrating vacancy 521, i.e. the penetrating cutout, and the spacing 514 in details, an enlarged view on the area encircled by the dash line 5B in FIG. 5A is shown in FIG. 5B. In FIG. 5B, the penetrating vacancy 521 can optionally include a substantially straight edge 521a, i.e. a straight edge or an edge with slight curvature. The liquid crystals are disposed above the first electrode 51 and the second electrode 52, but not shown in FIG. 5A for clarity. The display device 50 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 5A and 5B. In some embodiments, the virtual arrow L has a projection onto the second electrode 52, and the dark lines occurring around the ends of the slits of the first electrode due to non-uniform electrical field in the prior art can be further effectively eliminated by adopting the present embodiment to control an included angle between the substantially straight edge 521a and the projection of the virtual arrow L in a range of 14 to 90 degrees, preferably 30 to 60 degrees, further preferably 40 to 50 degrees, based on the design to adjust the relationship between the electrical fields at these ends of the spacings 514 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the substantially straight edge 521a forms a segment of a contour of the penetrating vacancy 521, i.e. a penetrating cutout, and has a projection onto the first electrode 51 and across one of the two width edges 514b and one of the two length edges 514a as shown in FIG. 5B.

Figure 5C:
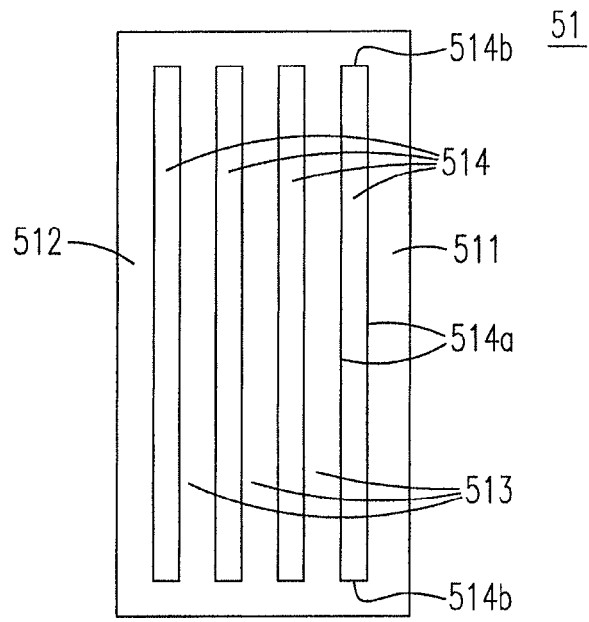
FIG. 5C is the schematic diagram showing a top view of the first electrode in the FFS LCD apparatus of FIG. 5A.
Figure 5D:
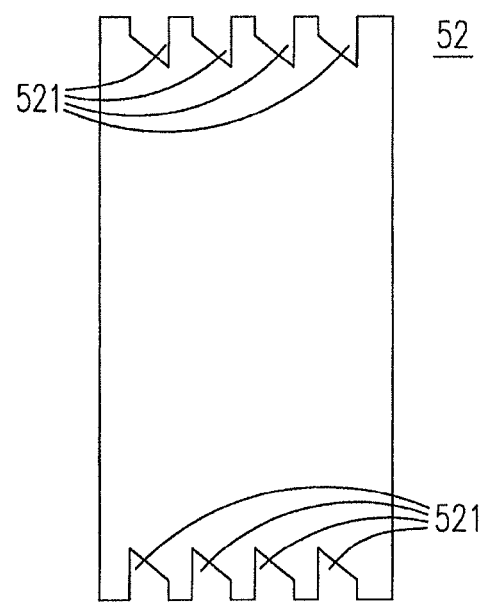
FIG. 5D is the schematic diagram showing a top view of the second electrode in the FFS LCD apparatus of FIG. 5A.

Similarly, for further clear illustration, the first electrode 51 in FIG. 5A is solely shown in FIG. 5C without showing the second electrode 52; while the second electrode 52 in FIG. 5A is solely shown in FIG. 5D without showing the first electrode 51. In FIG. 5D, the penetrating vacancy 521 is a penetrating cutout, i.e. a penetrating area, and the other area on the second electrode 52 is covered with transparent conductive materials, e.g. ITO.

In some embodiments, the FFS LCD apparatus 50 can include an FFS structure 500, which includes the first electrode 51 and the second electrode 52, and the penetrating vacancy 521 is formed within the FFS structure 500.

In some embodiments, the projection of the penetrating vacancy 521 overlaps one of the two ends of one of the plural spacings 514 to form an overlapped area 515, which size can be in a range of one tenth to three times of a square of the width of the spacing 514, i.e. $W^2$, where W is the width of the spacing.

In the present invention, the plural spacings can include slits, which can be straight slits or bending slits. When the plural spacings are bending slits, the bending angle can be ranged from 0.1 to 50 degrees.

Figure 6A:
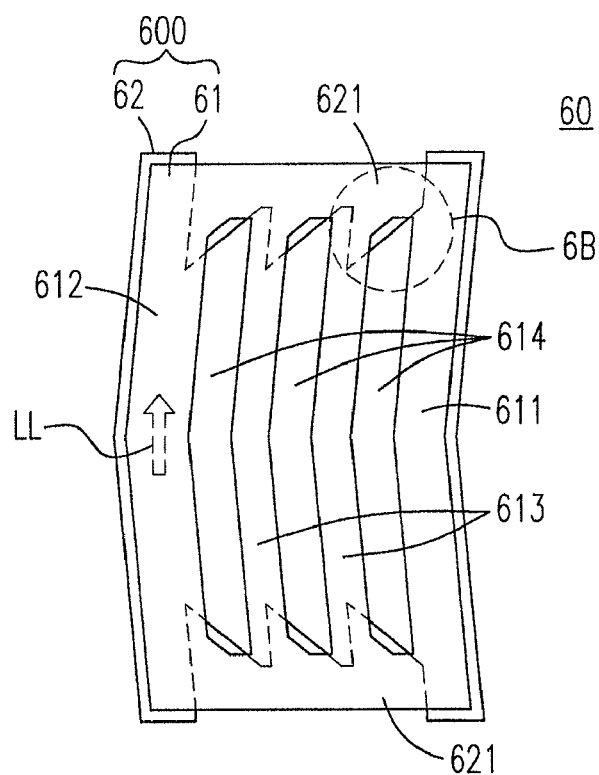
FIG. 6A is the schematic diagram showing a top view of an FFS LCD apparatus in one embodiment of the present invention.

FIG. 6A shows a top view of an FFS LCD apparatus in one embodiment of the present invention. In FIG. 6A, the FFS LCD apparatus 60 includes a first electrode 61 in a stacked relationship with a second electrode 62. The first electrode 61 includes a first side edge 611, a second side edge 612 and plural strips 613, which define plural spacings 614. In this embodiment, the spacings 614 are bending slits. Each of the plural strips 613 is formed between two of the plural spacings 614, and each of the plural spacings 614, i.e. bending slit, has two ends. The second electrode 62 include the penetrating vacancy 621, which has a projection overlapping one of the two ends of one of the plural spacings 614. The penetrating vacancy 621 is a penetrating cutout. Similarly, the first 61 and the second 62 electrodes are applied with opposite electrical charges so as to generate the electrical field between them. Similarly, in the present embodiment, since the area of the penetrating vacancy 621, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 6B:
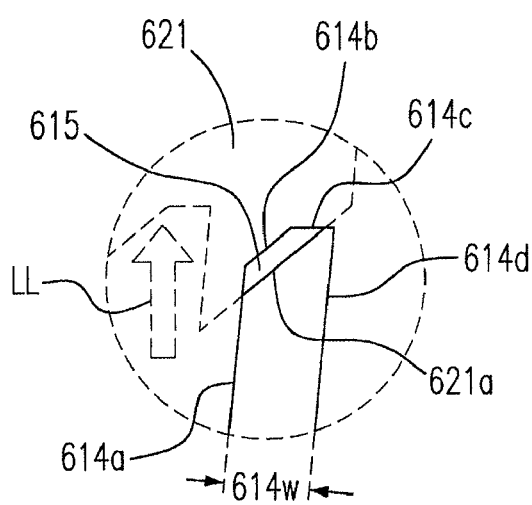
FIG. 6B is the schematic diagram showing an enlarged view on the area encircled by the dash line in FIG. 6A.

For better taking a look at the structural relationship between the penetrating vacancy 621, i.e. the penetrating cutout, and the spacing 614 in details, an enlarged view on the area encircled by the dash line 6B in FIG. 6A is shown in FIG. 6B. In FIG. 6B, the penetrating vacancy 621 can optionally include a substantially straight edge 621a, i.e. a straight edge or an edge with slight curvature. Each of the plural spacings 614 includes a first length edge 614a, a slant width edge 614b, a perpendicular width edge 614c and a second length 614d. As shown in FIG. 6B, the slant width edge 614b is connected between the first length edge 614a and the perpendicular width edge 614c, and the perpendicular edge 614c is connected with and perpendicular to the second length edge 614d. The slant width edge 614b has a projection onto the second electrode 62 and approximately parallel to the substantially straight edge 621a of the penetrating vacancy 621.

The liquid crystals are disposed above the first electrode 61 and the second electrode 62, but not shown in FIGS. 6A and 6B for clarity. The display device 60 can have a rubbing direction, which is the direction for rubbing the liquid crystals to be aligned in the rubbing direction after the liquid crystals are filled into the cells of the LCD panel during the manufacturing processes. For the better illustration, a virtual arrow LL representing the rubbing direction is shown in FIGS. 6A and 6B. In some embodiments, the virtual arrow LL has a projection onto the second electrode 62, and the dark lines occurring around the ends of the slits of the first electrode due to non-uniform electrical field in the prior art can be further effectively eliminated by adopting the present embodiment to control an included angle between the substantially straight edge 621a and the projection of the virtual arrow LL in a range of 14 to 90 degrees, preferably 30 to 60 degrees, further preferably 40 to 50 degrees, based on the design to adjust the relationship between the electrical fields at these ends of the spacings 614 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the substantially straight edge 621a forms a segment of a contour of the penetrating vacancy 621, i.e. a penetrating cutout, and has a projection onto the first electrode 61 and across the first length edge 614a and the perpendicular width 614c. In another embodiment, the substantially straight edge has a projection on the first electrode and across the first length edge and the second length edger.

Figure 6C:
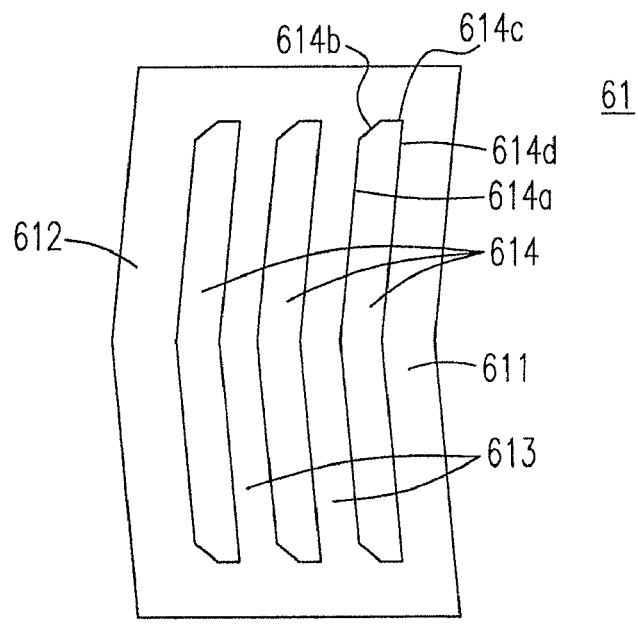
FIG. 6C is the schematic diagram showing a top view of the first electrode in the FFS LCD apparatus of FIG. 6A.
Figure 6D:
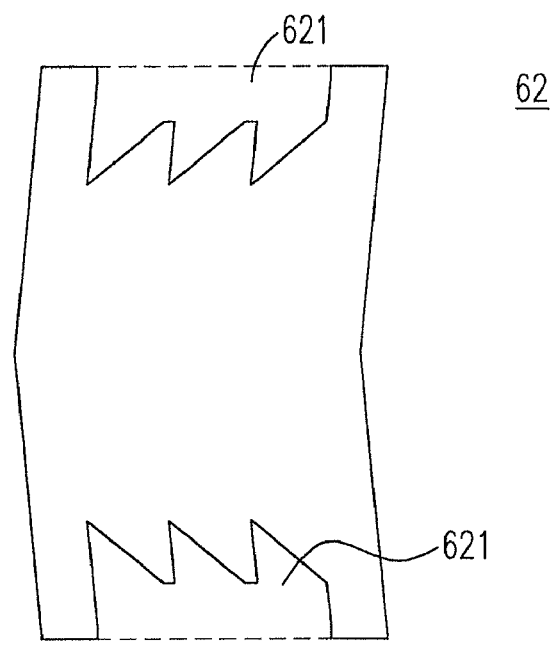
FIG. 6D is the schematic diagram showing a top view of the second electrode in the FFS LCD apparatus of FIG. 6A.

Similarly, for further clear illustration, the first electrode 61 in FIG. 6A is solely shown in FIG. 6C without showing the second electrode 62; while the second electrode 62 in FIG. 6A is solely shown in FIG. 6D without showing the first electrode 61. In FIG. 6D, the penetrating vacancy 621 is a penetrating cutout, i.e. a penetrating area, and the other area on the second electrode 62 is covered with transparent conductive materials, e.g. ITO.

In some embodiments, the FFS LCD apparatus 60 can include an FFS structure 600, which includes the first electrode 61 and the second electrode 62, and the penetrating vacancy 621 is formed within the FFS structure 600.

In some embodiments, the projection of the penetrating vacancy 621 overlaps one of the two ends of one of the plural spacings 614 to form an overlapped area 615, which size can be in a range of one tenth to three times of a square of the width 614w of the spacing 614, i.e. $W^2$, where W is the width of the spacing.

By the comparison of FIGS. 5D and 6D, it can be found that the penetrating cutouts 521 are separately formed for the respective ends of all spacings 514, i.e. slits, for example totally eight cutouts 521 in FIG. 5D; while each of the penetrating cutouts 621 is jointly formed for several ends of the spacings 614, i.e. slits, for example totally two cutouts 621 (one on the top and the other on the bottom) in FIG. 6D. That is to say, the penetrating cutouts or penetrating holes on the second electrode in the present invention can be flexibly designed to have any shape, size or quantity as long as the projections of these penetrating vacancies onto the first electrode overlap the ends of the spacings, e.g. slits, on the first electrode so as to modify the electrical fields thereon.

Figure 7A:
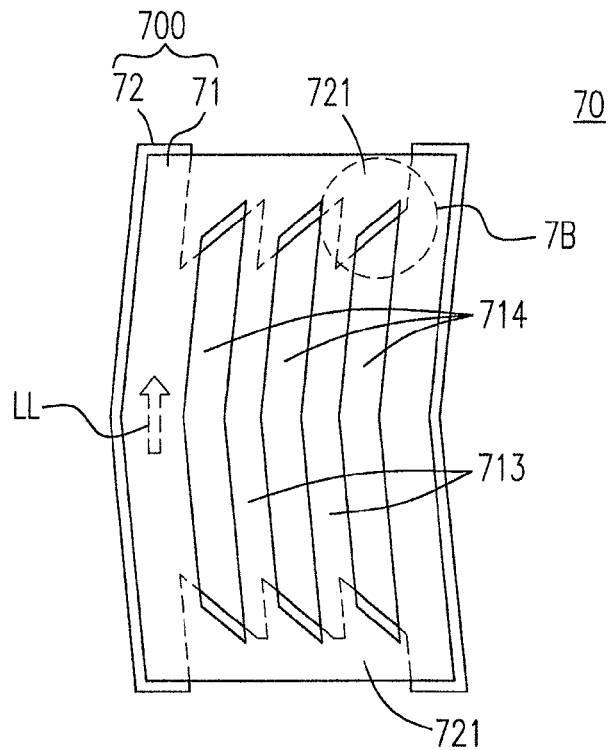
FIG. 7A is the schematic diagram showing a top view of an FFS LCD apparatus in one embodiment of the present invention.

FIG. 7A shows a top view of an FFS LCD apparatus in one embodiment of the present invention. In FIG. 7A, the FFS LCD apparatus 70 includes a first electrode 71 in a stacked relationship with a second electrode 72. The first electrode 71 includes a first side edge 711, a second side edge 712 and plural strips 713, which define plural spacings 714. In this embodiment, the spacings 714 are bending slits. Each of the plural strips 713 is formed between two of the plural spacings 714, and each of the plural spacings 714, i.e. bending slit, has two ends. The second electrode 72 include the penetrating vacancy 721, which has a projection overlapping one of the two ends of one of the plural spacings 714. The penetrating vacancy 721 is a penetrating cutout. Similarly, the first 71 and the second 72 electrodes are applied with opposite electrical charges so as to generate the electrical field between them. Similarly, in the present embodiment, since the area of the penetrating vacancy 721, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 7B:
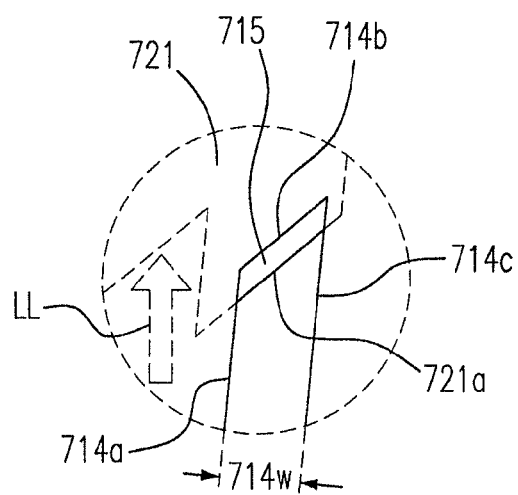
FIG. 7B is the schematic diagram showing an enlarged view on the area encircled by the dash line in FIG. 7A.

For better taking a look at the structural relationship between the penetrating vacancy 721, i.e. the penetrating cutout, and the spacing 714 in details, an enlarged view on the area encircled by the dash line 7B in FIG. 7A is shown in FIG. 7B. In FIG. 7B, the penetrating vacancy 721 can optionally include a substantially straight edge 721a, i.e. a straight edge or an edge with slight curvature. Each of the plural spacings 714 includes a first length edge 714a, a slant width edge 714b and a second length 714c. As shown in FIG. 7B, the slant width edge 714b is connected between the first length edge 714a and the second length edge 714c. The slant width edge 714b has a projection onto the second electrode 72 and approximately parallel to the substantially straight edge 721a of the penetrating vacancy 721.

The liquid crystals are disposed above the first electrode 71 and the second electrode 72, but not shown in FIGS. 7A and 7B for clarity. The display device 70 can have a rubbing direction, which is the direction for rubbing the liquid crystals to be aligned in the rubbing direction after the liquid crystals are filled into the cells of the LCD panel during the manufacturing processes. For the better illustration, a virtual arrow LL representing the rubbing direction is shown in FIGS. 7A and 7B. In some embodiments, the virtual arrow LL has a projection onto the second electrode 72, and the dark lines occurring around the ends of the slits of the first electrode due to non-uniform electrical field in the prior art can be further effectively eliminated by adopting the present embodiment to control an included angle between the substantially straight edge 721a and the projection of the virtual arrow LL in a range of 14 to 90 degrees, preferably 30 to 60 degrees, further preferably 40 to 50 degrees, based on the design to adjust the relationship between the electrical fields at these ends of the spacings 714 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the substantially straight edge 721a forms a segment of a contour of the penetrating vacancy 721, i.e. a penetrating cutout, and has a projection onto the first electrode 71 and across the first length edge 714a and the second length edge 714c.

Figure 7C:
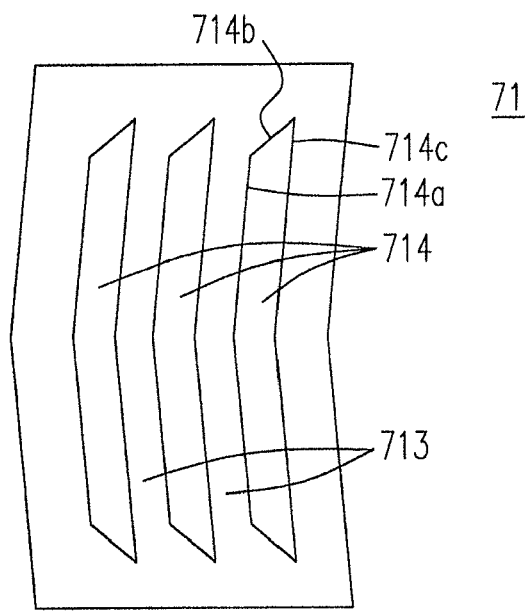
FIG. 7C is the schematic diagram showing a top view of the first electrode in the FFS LCD apparatus of FIG. 7A.
Figure 7D:
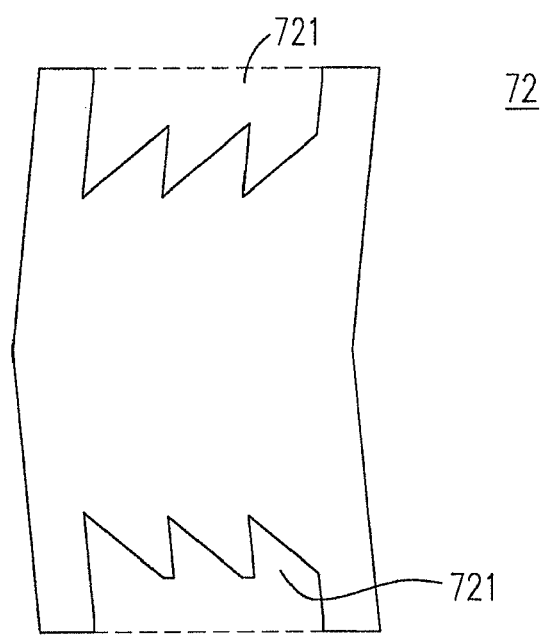
FIG. 7D is the schematic diagram showing a top view of the second electrode in the FFS LCD apparatus of FIG. 7A.

Similarly, for further clear illustration, the first electrode 71 in FIG. 7A is solely shown in FIG. 7C without showing the second electrode 72; while the second electrode 72 in FIG. 7A is solely shown in FIG. 7D without showing the first electrode 71. In FIG. 7D, the penetrating vacancy 721 is a penetrating cutout, i.e. a penetrating area, and the other area on the second electrode 72 is covered with transparent conductive materials, e.g. ITO.

In some embodiments, the FFS LCD apparatus 70 can include an FFS structure 700, which includes the first electrode 71 and the second electrode 72, and the penetrating vacancy 721 is formed within the FFS structure 700.

In some embodiments, the projection of the penetrating vacancy 721 overlaps one of the two ends of one of the plural spacings 714 to form an overlapped area 715, which size can be in a range of one tenth to three times of a square of the width 714w of the spacing 714, i.e. $W^2$, where W is the width of the spacing.

Figure 8A:
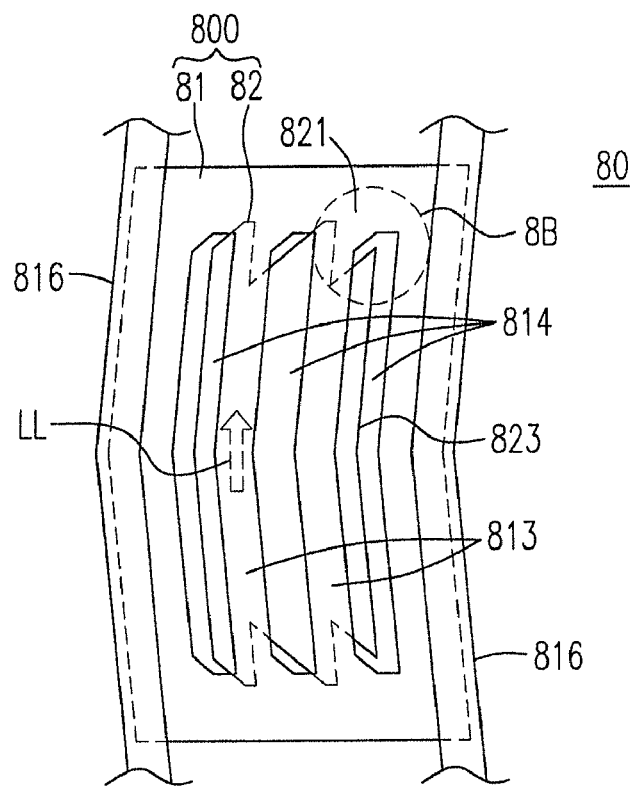
FIG. 8A is the schematic diagram showing a top view of an FFS LCD apparatus in one embodiment of the present invention.

FIG. 8A shows a top view of an FFS LCD apparatus in one embodiment of the present invention. In FIG. 8A, the FFS LCD apparatus 80 includes a first electrode 81 in a stacked relationship with a second electrode 82. The first electrode 81 includes a first side edge 811, a second side edge 812 and plural strips 813, which define plural spacings 814. In this embodiment, the spacings 814 are bending slits. Each of the plural strips 813 is formed between two of the plural spacings 814, and each of the plural spacings 814, i.e. bending slit, has two ends. The second electrode 82 include the penetrating vacancy 821, which has a projection overlapping one of the two ends of one of the plural spacings 814. The penetrating vacancy 821 is a penetrating cutout. Similarly, the first 81 and the second 82 electrodes are applied with opposite electrical charges so as to generate the electrical field between them. Similarly, in the present embodiment, since the area of the penetrating vacancy 821, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 8B:
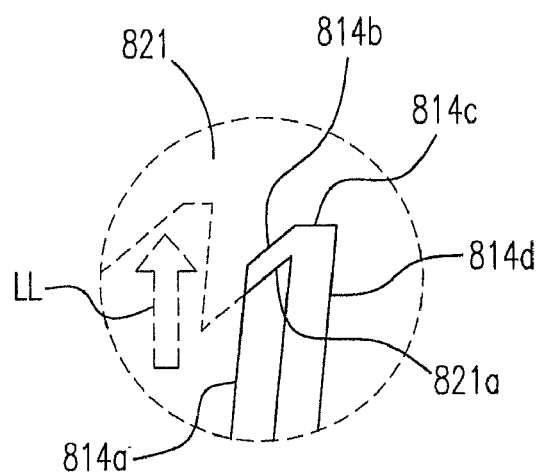
FIG. 8B is the schematic diagram showing an enlarged view on the area encircled by the dash line in FIG. 8A.

For better taking a look at the structural relationship between the penetrating vacancy 821, i.e. the penetrating cutout, and the spacing 814 in details, an enlarged view on the area encircled by the dash line 8B in FIG. 8A is shown in FIG. 8B. In FIG. 8B, the penetrating vacancy 821 can optionally include a substantially straight edge 821a, i.e. a straight edge or an edge with slight curvature. Each of the plural spacings 814 includes a first length edge 814a, a slant width edge 814b, a perpendicular width edge 814c and a second length 814d. As shown in FIG. 8B, the slant width edge 814b is connected between the first length edge 814a and the perpendicular width edge 814c, and the perpendicular edge 814c is connected with and perpendicular to the second length edge 814d. The slant width edge 814b has a projection onto the second electrode 82 and approximately parallel to the substantially straight edge 821a of the penetrating vacancy 821.

The liquid crystals are disposed above the first electrode 81 and the second electrode 82, but not shown in FIGS. 8A and 8B for clarity. The display device 80 can have a rubbing direction, which is the direction for rubbing the liquid crystals to be aligned in the rubbing direction after the liquid crystals are filled into the cells of the LCD panel during the manufacturing processes. For the better illustration, a virtual arrow LL representing the rubbing direction is shown in FIGS. 8A and 8B. In some embodiments, the virtual arrow LL has a projection onto the second electrode 82, and the dark lines occurring around the ends of the slits of the first electrode due to non-uniform electrical field in the prior art can be further effectively eliminated by adopting the present embodiment to control an included angle between the substantially straight edge 821a and the projection of the virtual arrow LL in a range of 14 to 90 degrees, preferably 30 to 60 degrees, further preferably 40 to 50 degrees, based on the design to adjust the relationship between the electrical fields at these ends of the spacings 814 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the FFS LCD apparatus 80 includes two data lines 816 located above the first electrode 81. In another embodiment, the data lines may be located below the first electrode. In this embodiment, the spacings 814 include two outmost spacings, i.e. the two spacings most close to the two data lines 816, and the second electrode 82 has an edge 823, which has a projection onto the first electrode 81. The projection of the edge 823 can be disposed partially or entirely inside one of the two outmost spacings of the spacings 814. In this embodiment, the projection of the edge 823 is disposed entirely inside one of the two outmost spacings of the spacings 814. That is to say, in this embodiment, a projection of the data lines 816 onto the first electrode 81 is quite close to the outmost spacings of the spacings 814 of the first electrode 81 for the compact design. In such conditions, in order to avoid the electrical interference between the data lines 816 and the second electrode 82 on the electrical fields around two outmost spacings 814, the second electrode 82 shown in FIG. 8D is shrunk inwards as compared to other embodiments shown in FIGS. 2D-7D, that is, the area of the second electrode 82 in FIG. 8D is smaller than those of the second electrodes 22, 32, 42, 52, 62 and 72 shown in FIGS. 2D-7D. The substantially straight edge 821a forms a segment of a contour of the penetrating vacancy 821, i.e. a penetrating cutout, and has a projection onto the first electrode 81 and across the first length edge 814a as shown in FIG. 8B, when the penetrating vacancy 821 overlaps one end of one outmost spacing of the spacings 814.

Figure 8C:
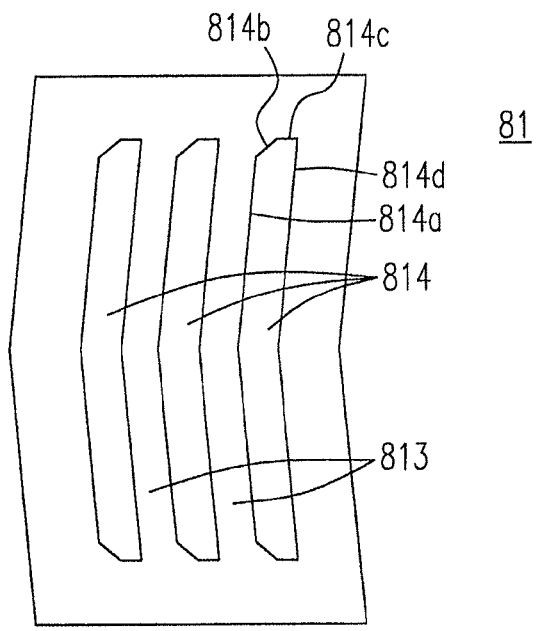
FIG. 8C is the schematic diagram showing a top view of the first electrode in the FFS LCD apparatus of FIG. 8A.
Figure 8D:
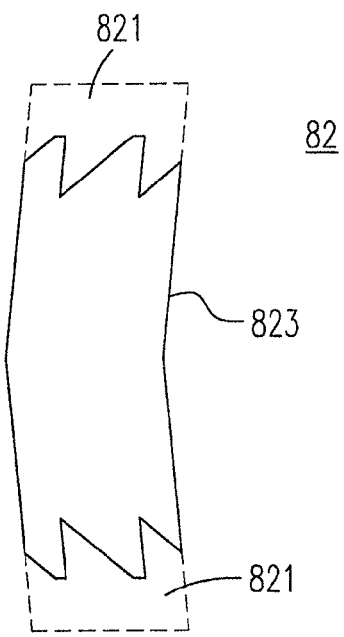
FIG. 8D is the schematic diagram showing a top view of the second electrode in the FFS LCD apparatus of FIG. 8A.

Similarly, for further clear illustration, the first electrode 81 in FIG. 8A is solely shown in FIG. 8C without showing the second electrode 82; while the second electrode 82 in FIG. 8A is solely shown in FIG. 8D without showing the first electrode 81. In FIG. 8D, the penetrating vacancy 821 is a penetrating cutout, i.e. a penetrating area, and the other area on the second electrode 82 is covered with transparent conductive materials, e.g. ITO.

In some embodiments, the FFS LCD apparatus 80 can include an FFS structure 800, which includes the first electrode 81 and the second electrode 82, and the penetrating vacancy 821 is formed within the FFS structure 800.

Figure 9A:
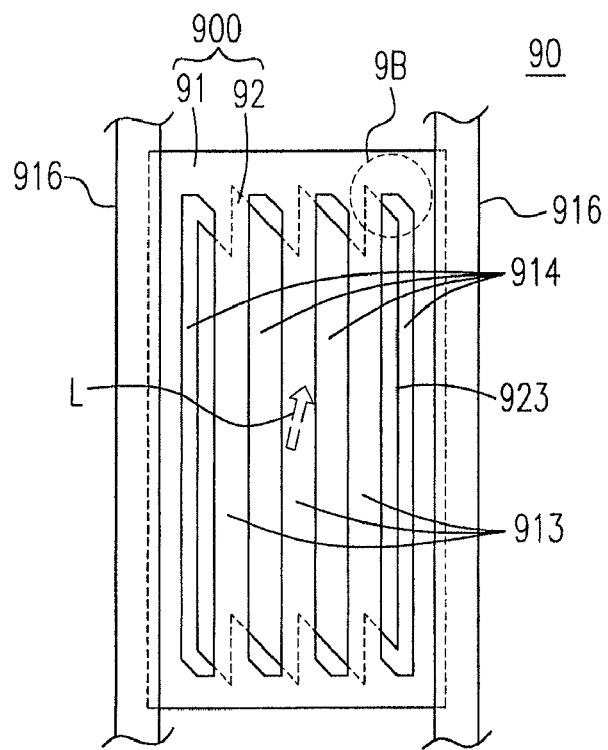
FIG. 9A is the schematic diagram showing a top view of an FFS LCD apparatus in one embodiment of the present invention.

FIG. 9A shows a top view of an FFS LCD apparatus in one embodiment of the present invention. In FIG. 9A, the FFS LCD apparatus 90 includes a first electrode 91 in a stacked relationship with a second electrode 92. The first electrode 91 includes a first side edge 911, a second side edge 912 and plural strips 913, which define plural spacings 914. In this embodiment, the spacings 914 are straight slits. Each of the plural strips 913 is formed between two of the plural spacings 914, and each of the plural spacings 914, i.e. straight slit, has two ends. The second electrode 92 include the penetrating vacancy 921, which has a projection overlapping one of the two ends of one of the plural spacings 914. The penetrating vacancy 921 is a penetrating cutout. Similarly, the first 91 and the second 92 electrodes are applied with opposite electrical charges so as to generate the electrical field between them. Similarly, in the present embodiment, since the area of the penetrating vacancy 921, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 9B:
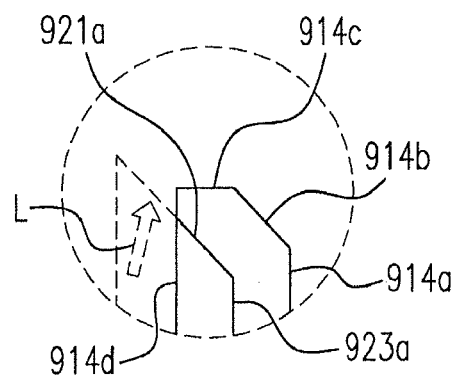
FIG. 9B is the schematic diagram showing an enlarged view on the area encircled by the dash line in FIG. 9A.

For better taking a look at the structural relationship between the penetrating vacancy 921, i.e. the penetrating cutout, and the spacing 914 in details, an enlarged view on the area encircled by the dash line 9B in FIG. 9A is shown in FIG. 9B. In FIG. 9B, the penetrating vacancy 921 can optionally include a substantially straight edge 921a, i.e. a straight edge or an edge with slight curvature. Each of the plural spacings 914 includes a first length edge 914a, a slant width edge 914b, a perpendicular width edge 914c and a second length 914d. As shown in FIG. 9B, the slant width edge 914b is connected between the first length edge 914a and the perpendicular width edge 914c. The perpendicular edge 914c is connected with and perpendicular to the second length edge 914d. The slant width edge 914c has a projection onto the second electrode 92 and approximately parallel to the substantially straight edge 921a of the penetrating vacancy 921.

The liquid crystals are disposed above the first electrode 91 and the second electrode 92, but not shown in FIGS. 9A and 9B for clarity. The display device 90 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 9A and 9B. In some embodiments, the virtual arrow L has a projection onto the second electrode 92, and the dark lines occurring around the ends of the slits of the first electrode due to non-uniform electrical field in the prior art can be further effectively eliminated by adopting the present embodiment to control an included angle between the substantially straight edge 921a and the projection of the virtual arrow L in a range of 14 to 90 degrees, preferably 30 to 60 degrees, further preferably 40 to 50 degrees, based on the design to adjust the relationship between the electrical fields at these ends of the spacings 914 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the FFS LCD apparatus 90 includes two data lines 916 located above the first electrode 91. In another embodiment, the data lines may be located below the first electrode. In this embodiment, the spacings 914 include two outmost spacings, i.e. the two spacings most close to the two data lines 916, and the second electrode 92 has an edge 923, which has a projection onto the first electrode 91. The projection of the edge 923 can be disposed partially or entirely inside one of the two outmost spacings of the spacings 914. In this embodiment, the projection of the edge 923 is disposed entirely inside one of the two outmost spacings of the spacings 914. That is to say, in this embodiment, a projection of the data lines 916 onto the first electrode 91 is quite close to the outmost spacings of the spacings 914 of the first electrode 91 for the compact design. In such conditions, in order to avoid the electrical interference between the data lines 916 and the second electrode 92 on the electrical fields around two outmost spacings 914, the second electrode 92 shown in FIG. 9D is shrunk inwards as compared to other embodiments shown in FIGS. 2D-7D, that is, the area of the second electrode 92 in FIG. 9D is smaller than those of the second electrodes 22, 32, 42, 52, 62 and 72 shown in FIGS. 2D-7D. The substantially straight edge 921a forms a segment of a contour of the penetrating vacancy 921, i.e. a penetrating cutout, and has a projection onto the first electrode 91 and across the second length edge 914d as shown in FIG. 9B, when the penetrating vacancy 921 overlaps one end of one outmost spacing of the spacings 914.

Figure 9C:
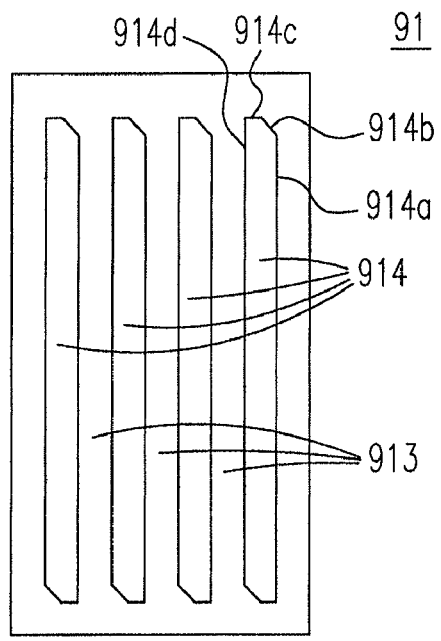
FIG. 9C is the schematic diagram showing a top view of the first electrode in the FFS LCD apparatus of FIG. 9A.
Figure 9D:
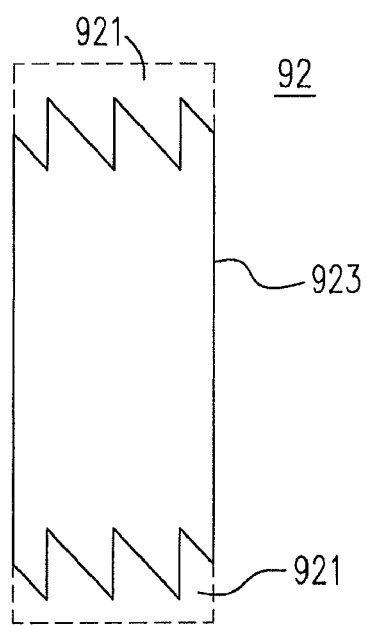
FIG. 9D is the schematic diagram showing a top view of the second electrode in the FFS LCD apparatus of FIG. 9A.

Similarly, for further clear illustration, the first electrode 91 in FIG. 9A is solely shown in FIG. 9C without showing the second electrode 92; while the second electrode 92 in FIG. 9A is solely shown in FIG. 9D without showing the first electrode 91.

In some embodiments, the FFS LCD apparatus 90 can include an FFS structure 900, which includes the first electrode 91 and the second electrode 92, and the penetrating vacancy 921 is formed within the FFS structure 900.

Figure 10A:
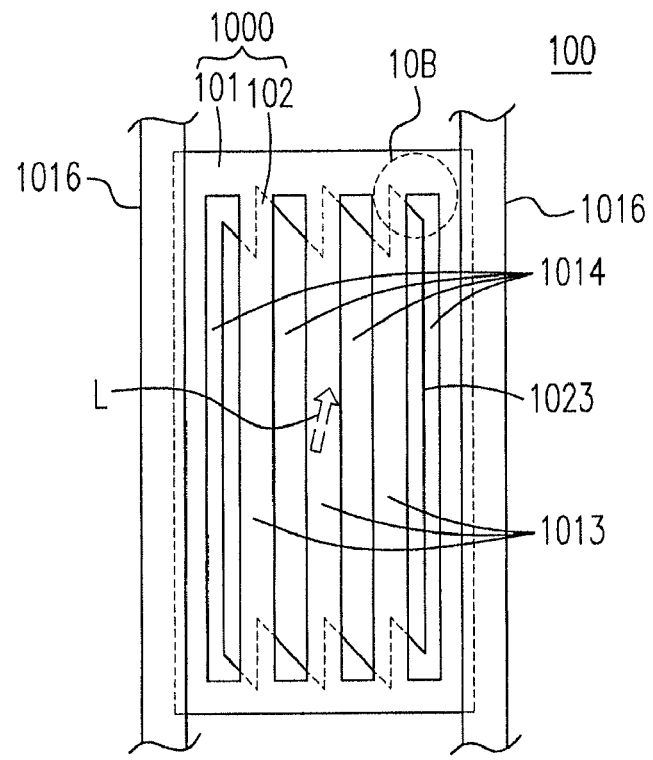
FIG. 10A is the schematic diagram showing a top view of an FFS LCD apparatus in one embodiment of the present invention.

FIG. 10A shows a top view of an FFS LCD apparatus in one embodiment of the present invention. In FIG. 10A, the FFS LCD apparatus 100 includes a first electrode 101 in a stacked relationship with a second electrode 102. The first electrode 101 includes a first side edge 1011, a second side edge 1012 and plural strips 1013, which define plural spacings 1014. In this embodiment, the spacings 1014 are straight slits. Each of the plural strips 1013 is formed between two of the plural spacings 1014, and each of the plural spacings 1014, i.e. straight slit, has two ends. The second electrode 102 include the penetrating vacancy 1021, which has a projection overlapping one of the two ends of one of the plural spacings 1014. The penetrating vacancy 1021 is a penetrating cutout. Similarly, the first 101 and the second 102 electrodes are applied with opposite electrical charges so as to generate the electrical field between them. Similarly, in the present embodiment, since the area of the penetrating vacancy 1021, i.e. the penetrating cutout, cannot be electrically charged, the phenomenon of the non-uniformity in the directions of the electrical fields around the slit ends occurring in the prior art can be effectively and largely eliminated to provide the better display performance by adopting the structure of the present embodiment.

Figure 10B:
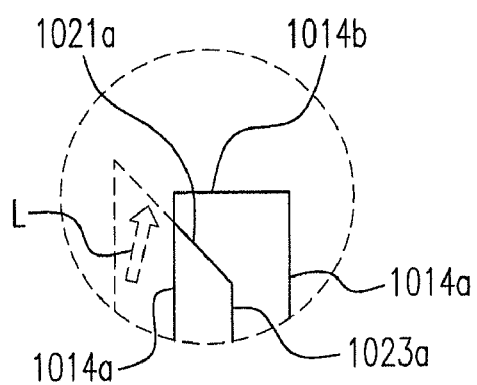
FIG. 10B is the schematic diagram showing an enlarged view on the area encircled by the dash line in FIG. 10A.

For better taking a look at the structural relationship between the penetrating vacancy 1021, i.e. the penetrating cutout, and the spacing 1014 in details, an enlarged view on the area encircled by the dash line 10B in FIG. 10A is shown in FIG. 10B. In FIG. 10B, the penetrating vacancy 1021 can optionally include a substantially straight edge 1021a, i.e. a straight edge or an edge with slight curvature. Each of the plural spacings 1014 includes two length edges 1024a and two width edges 1014b as shown in FIG. 10B.

The liquid crystals are disposed above the first electrode 101 and the second electrode 102, but not shown in FIGS. 10A and 10B for clarity. The display device 100 can have a rubbing direction, which is the direction for rubbing the liquid crystals to be aligned in the rubbing direction after the liquid crystals are filled into the cells of the LCD panel during the manufacturing processes. For the better illustration, a virtual arrow L representing the rubbing direction is shown in FIGS. 10A and 10B. In some embodiments, the virtual arrow L has a projection onto the second electrode 102, and the dark lines occurring around the ends of the slits of the first electrode due to non-uniform electrical field in the prior art can be effectively eliminated by adopting the present embodiment to control an included angle between the substantially straight edge 1021a and the projection of the virtual arrow L in a range of 14 to 90 degrees, preferably 30 to 60 degrees, further preferably 40 to 50 degrees, based on the design to adjust the relationship between the electrical fields at these ends of the spacings 1014 and the oriented directions of the liquid crystals during the operation. In accordance with the experimental data, the above included angle around 45 degrees can provide very excellent display performance without any dark line at the ends of the spacings, e.g. slits, of the first electrode.

In this embodiment, the FFS LCD apparatus 100 includes two data lines 1016 located above the first electrode 101. In another embodiment, the data lines may be located below the first electrode. In this embodiment, the spacings 1014 include two outmost spacings, i.e. the two spacings most close to the two data lines 1016, and the second electrode 102 has an edge 1023, which has a projection onto the first electrode 101. The projection of the edge 1023 can be disposed partially or entirely inside one of the two outmost spacings of the spacings 1014. In this embodiment, the projection of the edge 1023 is disposed entirely inside one of the two outmost spacings of the spacings 1014. That is to say, in this embodiment, a projection of the data lines 1016 onto the first electrode 101 is quite close to the outmost spacings of the spacings 1014 of the first electrode 101 for the compact design. In such conditions, in order to avoid the electrical interference between the data lines 1016 and the second electrode 102 on the electrical fields around two outmost spacings 1014, the second electrode 102 shown in FIG. 10D is shrunk inwards as compared to other embodiments shown in FIGS. 2D-7D, that is, the area of the second electrode 102 in FIG. 10D is smaller than those of the second electrodes 22, 32, 42, 52, 62 and 72 shown in FIGS. 2D-7D. The substantially straight edge 1021a forms a segment of a contour of the penetrating vacancy 1021, i.e. a penetrating cutout, and has a projection onto the first electrode 101 and across one length edge 1024a of one outmost spacing of the spacings 1014 as shown in FIG. 10B, when the penetrating vacancy 1021 overlaps one end of one outmost spacing of the spacings 1014.

Figure 10C:
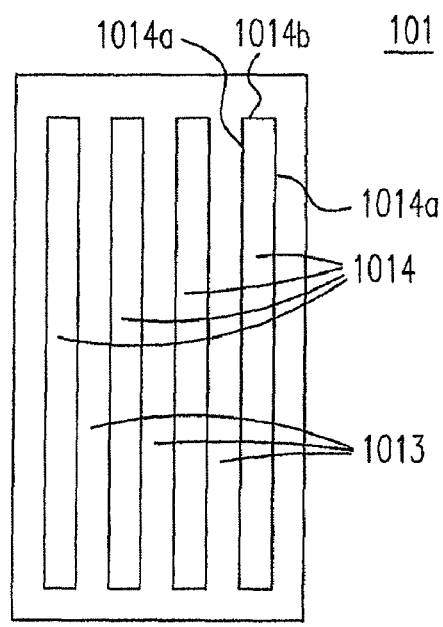
FIG. 10C is the schematic diagram showing a top view of the first electrode in the FFS LCD apparatus of FIG. 10A.
Figure 10D:
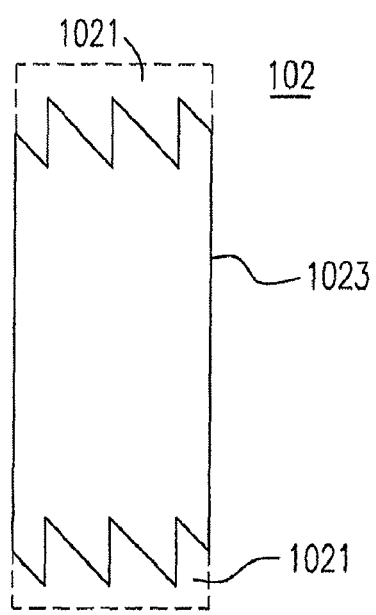
FIG. 10D is the schematic diagram showing a top view of the second electrode in the FFS LCD apparatus of FIG. 10A.

Similarly, for further clear illustration, the first electrode 101 in FIG. 10A is solely shown in FIG. 10C without showing the second electrode 102; while the second electrode 102 in FIG. 10A is solely shown in FIG. 10D without showing the first electrode 101.

In some embodiments, the FFS LCD apparatus 100 can include an FFS structure 1000, which includes the first electrode 101 and the second electrode 102, and the penetrating vacancy 1021 is formed within the FFS structure 1000.

Each of the penetrating vacancies in all the above embodiments can be replaced by an electrical-field modifying device, and in such conditions, the efficacy of eliminating the dark lines around the ends of the slits of the first electrode still can be successfully reached. The electrical-field modifying device includes a penetrating hole, a penetrating cutout, an insulating area, a combination thereof etc., where the insulating area is the area covered by insulating material, preferably transparent insulating material, e.g. $SiO_2$, $TiO_2$, $Ta_2O_5$, transparent glue, etc.

In all the above embodiments, the first electrode can be a pixel electrode when the second electrode is a counter electrode; and the first electrode can be a counter electrode when the second electrode is a pixel electrode, and there can be a transparent insulating layer (not shown in figures) disposed between he first and the second electrodes to generate the electrical field therebetween. This insulating layer can include a material of oxide or nitride. In all the above embodiments, the quantity, size and shape of the penetrating vacancies are not limited and can be flexibly adjusted according to the practical requirements as long as their projections onto the first electrode overlap the ends of the spacings.

In the above embodiments, the first and the second electrodes can be made of transparent conductive material, e.g. indium tin oxide (ITO), tin oxide, fluorine-doped tin oxide, zinc oxide, aluminum-doped zinc oxide, gallium-doped zinc oxide, etc.

All the embodiments shown in FIGS. 2A-10D are some representative embodiments for the illustration only, and cannot be used to limit the scope of the present invention. To sum up all the above embodiments, all the shape, size and quantity of the penetrating vacancy or electrical-field modifying device on the second electrode can be adequately varied, as long as the projection of the penetrating vacancy or electrical-field modifying device overlaps the end of the spacing, e.g. slit, on the first electrode in order to modify the electrical fields around the ends of the spacings. All the following technical features can be optionally and independently selected or combined into these above-mentioned main technical features. The electrical-field modifying device includes one selected from a group consisting of a penetrating hole, a penetrating cutout, an insulating area and a combination thereof. The spacings of the first electrode can be optionally and independently designed as straight slits or bending slits. The penetrating vacancy or electrical-field modifying device can optionally and independently include a substantially straight edge. Each of the spacings on the second electrode includes length edges, and can optionally and independently include a slant width edge, which can be parallel to the substantially straight edge of the penetrating vacancy or electrical-field modifying device.

Some embodiments of the present invention are described in the followings.

1. A fringe field switching (FFS) liquid crystal display (LCD) apparatus includes a first electrode and a second electrode. The first electrode includes a first side edge, a second side edge and plural strips defining plural spacings between the first and the second side edges, wherein each of the plural strips is formed between two of the plural spacings, and each of the plural spacings has two ends. The second electrode is disposed in a stacked relationship with the first electrode, and includes at least a penetrating vacancy having a projection overlapping one of the two ends of one of the plural spacings.

2. A fringe field switching (FFS) liquid crystal display (LCD) apparatus includes a first electrode and a second electrode. The first electrode includes a first side edge, a second side edge and plural strips defining plural spacings between the first and the second side edges, wherein each of the plural strips is formed between two of the plural spacings, and each of the plural spacings has two ends. The second electrode is disposed in a stacked relationship with the first electrode, and includes at least an electrical-field modifying device having a projection overlapping one of the two ends of one of the plural spacings.

3. A fringe field switching (FFS) liquid crystal display (LCD) apparatus includes a first electrode, a second electrode and at least an electrical-field modifying device. The first electrode includes plural spacings defining plural strips, wherein each of the plural strips is formed between two of the plural spacings, and each of the plural spacings has two ends. The second electrode is disposed in a stacked relationship with the first electrode. The electrical-field modifying device has a projection overlapping one of the two ends of one of the plural spacings.

4. An FFS LCD apparatus of any one of the above embodiments further includes a liquid crystal disposed above the first and the second electrodes, and has a virtual arrow and a rubbing direction for rubbing the liquid crystal. The virtual arrow represents the rubbing direction and has a projection onto the second electrode. The penetrating vacancy includes a substantially straight edge. The substantially straight edge and the projection of the virtual arrow have an included angle in a range of 14 to 90 degrees.

5. In an FFS LCD apparatus of any one of the above embodiments, each of the plural spacings includes two width edges and two length edges, and the substantially straight edge forms a segment of a contour of the penetrating vacancy and has a projection onto the first electrode and across the two length edges.

6. In an FFS LCD apparatus of any one of the above embodiments, each of the plural spacings includes two width edges and two length edges, and the substantially straight edge forms a segment of a contour of the penetrating vacancy and has a projection onto the first electrode and across one of the two width edges and one of the two length edges.

7. In an FFS LCD apparatus of any one of the above embodiments, at least one of the plural spacings includes a first length edge, a second length edge, a slant width edge and a perpendicular width edge. The slant width edge is connected between the first length edge and the perpendicular width edge. The perpendicular edge is connected with and perpendicular to the second length edge. The slant width edge has a projection onto the second electrode and approximately parallel to the substantially straight edge of the penetrating vacancy.

8. In an FFS LCD apparatus of any one of the above embodiments, at least one of the plural spacings has a first length edge, a second length edge and a slant width edge. The slant width edge is connected between the first length edge and the second length edge and has a projection onto the second electrode, and the projection of the slant width edge is approximately parallel to the substantially straight edge of the penetrating vacancy.

9. In an FFS LCD apparatus of any one of the above embodiments, each of the plural spacings has a width, and the projection of the penetrating vacancy overlaps the one of the two ends to form an overlapped area, which has a size in a range of one tenth to three times of a square of the width.

10. An FFS LCD apparatus of any one of the above embodiments further includes an insulating layer and an FFS structure. The insulating layer is disposed between the first electrode and the second electrode and includes one of an oxide and a nitride. The FFS structure includes the first electrode and the second electrode. The penetrating vacancy is formed inside the second electrode and within the FFS structure. The plural spacings include one selected from a group consisting of a straight slit, a bending slit and a combination thereof. The first electrode is a pixel electrode when the second electrode is a counter electrode. The first electrode is a counter electrode when the second electrode is a pixel electrode. Each of the first and the second electrodes includes a transparent conductive material. The penetrating vacancy includes one of a penetrating hole and a penetrating cutout.

11. In an FFS LCD apparatus of any one of the above embodiments, the one outmost spacing has two length edges, and the penetrating vacancy is a penetrating cutout including a substantially straight edge, which forms a segment of a contour of the penetrating cutout and has a projection onto the first electrode and across one of the two length edges of the one outmost spacing.

12. An FFS LCD apparatus of any one of the above embodiments further includes a liquid crystal disposed above the first and the second electrodes, and has a virtual arrow and a rubbing direction for rubbing the liquid crystal. The virtual arrow represents the rubbing direction and has a projection onto the second electrode. The electrical-field modifying device includes a substantially straight edge. The substantially straight edge and the projection of the virtual arrow have an included angle in a range of 14 to 90 degrees.

13. In an FFS LCD apparatus of any one of the above embodiments, each of the plural spacings includes two width edges and two length edges, the electrical-field modifying device includes one selected from a group consisting of a penetrating hole, a penetrating cutout, an insulating area and a combination thereof, and the substantially straight edge forms a segment of a contour of the electrical-field modifying device and has a projection onto the first electrode and across the two length edges.

14. In an FFS LCD apparatus of any one of the above embodiments, each of the plural spacings includes two width edges and two length edges, and the substantially straight edge forms a segment of a contour of the electrical-field modifying device and has a projection onto the first electrode and across one of the two width edges and one of the two length edges.

15. In an FFS LCD apparatus of any one of the above embodiments, the included angle is ranged from 30 to 60 degrees.

16. In an FFS LCD apparatus of any one of the above embodiments, at least one of the plural spacings has a first length edge, a second length edge, a slant width edge and a perpendicular width edge. The slant width edge is connected between the first length edge and the perpendicular width edge. The perpendicular edge is connected with and perpendicular to the second length edge. The slant width edge has a projection onto the second electrode and approximately parallel to the substantially straight edge of the electrical-field modifying device.

17. In an FFS LCD apparatus of any one of the above embodiments, at least one of the plural spacings has a first length edge, a second length edge and a slant width edge. The slant width edge is connected between the first length edge and the second length edge and has a projection onto the second electrode, and the projection of the slant width edge is approximately parallel to the substantially straight edge of the electrical-field modifying device.

18. In an FFS LCD apparatus of any one of the above embodiments, each of the plural spacings has a width, and the projection of the electrical-field modifying device overlaps the one of the two ends to form an overlapped area, which has a size in a range of one tenth to three times of a square of the width.

19. An FFS LCD apparatus of any one of the above embodiments further includes an insulating layer and an FFS structure. The insulating layer is disposed between the first electrode and the second electrode and includes one of an oxide and a nitride. The FFS structure includes the first electrode and the second electrode, wherein the electrical-field modifying device is formed inside the second electrode and within the FFS structure. The plural spacings include one selected from a group consisting of a straight slit, a bending slit and a combination thereof. The first electrode is a pixel electrode when the second electrode is a counter electrode. The first electrode is a counter electrode when the second electrode is a pixel electrode. Each of the first and the second electrodes includes a transparent conductive material. The electrical-field modifying device includes one selected from a group consisting of a penetrating hole, a penetrating cutout, an insulating area and a combination thereof.

20. In an FFS LCD apparatus of any one of the above embodiments, when the plural spacings include a bending slit, the bending slit has a bending angle in a range of 0.1 to 50 degrees.

21. In an FFS LCD apparatus of any one of the above embodiments, the plural spacings includes two outmost spacings. The second electrode has an edge having a projection onto the first electrode, wherein the projection of the edge of the second electrode is disposed in one of places partially and entirely inside one of the two outmost spacings.

22. In an FFS LCD apparatus of any one of the above embodiments, the one outmost spacing has two length edges, and the electrical-field modifying device is a penetrating cutout including a substantially straight edge, which forms a segment of a contour of the penetrating cutout and has a projection onto the first electrode and across one of the two length edges of the one outmost spacing.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fringe field switching (FFS) liquid crystal display (LCD) apparatus, comprising:
    a first electrode including:
        a first side edge;
        a second side edge; and
        plural strips defining plural spacings between the first and the second side edges, wherein each of the plural strips is formed between two of the plural spacings, and each of the plural spacings has two ends; and
    a second electrode disposed in a stacked relationship with the first electrode, and including at least a penetrating vacancy having a projection overlapping one of the two ends of one of the plural spacings, wherein the penetrating vacancy includes a substantially straight edge, each of the plural spacings includes two width edges and two length edges, and the substantially straight edge forms a segment of a contour of the penetrating vacancy and has a projection onto the first electrode and across the two length edges.

2. An FFS LCD apparatus of claim 1, further comprising a liquid crystal disposed above the first and the second electrodes, and having a virtual arrow and a rubbing direction for rubbing the liquid crystal, wherein:
    the virtual arrow represents the rubbing direction and has a projection onto the second electrode; and
    the substantially straight edge and the projection of the virtual arrow have an included angle in a range of 14 to 90 degrees.

3. An FFS LCD apparatus of claim 2, wherein each of the plural spacings includes two width edges and two length edges, and the substantially straight edge forms a segment of a contour of the penetrating vacancy and has a projection onto the first electrode and across one of the two width edges and one of the two length edges.

4. An FFS LCD apparatus of claim 2, wherein the included angle is ranged from 30 to 60 degrees.

5. An FFS LCD apparatus of claim 2, wherein:
    at least one of the plural spacings includes a first length edge, a second length edge, a slant width edge and a perpendicular width edge;
    the slant width edge is connected between the first length edge and the perpendicular width edge;
    the perpendicular edge is connected with and perpendicular to the second length edge; and
    the slant width edge has a projection onto the second electrode and approximately parallel to the substantially straight edge of the penetrating vacancy.

6. An FFS LCD apparatus of claim 2, wherein:
    at least one of the plural spacings has a first length edge, a second length edge and a slant width edge; and
    the slant width edge is connected between the first length edge and the second length edge and has a projection onto the second electrode, and the projection of the slant width edge is approximately parallel to the substantially straight edge of the penetrating vacancy.

7. An FFS LCD apparatus of claim 1, wherein each of the plural spacings has a width, and the projection of the penetrating vacancy overlaps the one of the two ends to form an overlapped area, which has a size in a range of one tenth to three times of a square of the width.

8. An FFS LCD apparatus of claim 1, further comprising:
an insulating layer disposed between the first electrode and the second electrode and including one of an oxide and a nitride; and
an FFS structure including the first electrode and the second electrode, wherein the penetrating vacancy is formed inside the second electrode and within the FFS structure,
wherein the plural spacings include one selected from a group consisting of a straight slit, a bending slit and a combination thereof;
the first electrode is a pixel electrode when the second electrode is a counter electrode;
the first electrode is a counter electrode when the second electrode is a pixel electrode;
each of the first and the second electrodes includes a transparent conductive material;
the penetrating vacancy includes one of a penetrating hole and a penetrating cutout; and
when the plural spacings include a bending slit, the bending slit has a bending angle in a range of 0.1 to 50 degrees.

9. An FFS LCD apparatus of claim 1, wherein:
the plural spacings include two outmost spacings;
the second electrode has an edge having a projection onto the first electrode, wherein the projection of the edge of the second electrode is disposed in one of places partially and entirely inside one of the two outmost spacings;
the one outmost spacing has two length edges; and
the penetrating vacancy is a penetrating cutout including a substantially straight edge, which forms a segment of a contour of the penetrating cutout and has a projection onto the first electrode and across one of the two length edges of the one outmost spacing.

10. A fringe field switching (FFS) liquid crystal display (LCD) apparatus, comprising:
a first electrode including:
a first side edge;
a second side edge; and
plural strips defining plural spacings between the first and the second side edges, wherein each of the plural strips is formed between two of the plural spacings, and each of the plural spacings has two ends; and
a second electrode disposed in a stacked relationship with the first electrode, and including at least an electrical-field modifying device having a projection overlapping one of the two ends of one of the plural spacings, wherein each of the plural spacings has a width, and the projection of the electrical-field modifying device overlaps the one of the two ends to form an overlapped area, which has a size in a range of one tenth to three times of a square of the width.

11. An FFS LCD apparatus of claim 10, further comprising a liquid crystal disposed above the first and the second electrodes, and having a virtual arrow and a rubbing direction for rubbing the liquid crystal, wherein:
the virtual arrow represents the rubbing direction and has a projection onto the second electrode;
the electrical-field modifying device includes a substantially straight edge; and
the substantially straight edge and the projection of the virtual arrow have an included angle in a range of 14 to 90 degrees.

12. An FFS LCD apparatus of claim 11, wherein each of the plural spacings includes two width edges and two length edges, the electrical-field modifying device includes one selected from a group consisting of a penetrating hole, a penetrating cutout, an insulating area and a combination thereof, and the substantially straight edge forms a segment of a contour of the electrical-field modifying device and has a projection onto the first electrode and across the two length edges.

13. An FFS LCD apparatus of claim 11, wherein each of the plural spacings includes two width edges and two length edges, and the substantially straight edge forms a segment of a contour of the electrical-field modifying device and has a projection onto the first electrode and across one of the two width edges and one of the two length edges.

14. An FFS LCD apparatus of claim 11, wherein the included angle is ranged from 30 to 60 degrees.

15. An FFS LCD apparatus of claim 11, wherein:
at least one of the plural spacings has a first length edge, a second length edge, a slant width edge and a perpendicular width edge;
the slant width edge is connected between the first length edge and the perpendicular width edge;
the perpendicular edge is connected with and perpendicular to the second length edge; and
the slant width edge has a projection onto the second electrode and approximately parallel to the substantially straight edge of the electrical-field modifying device.

16. An FFS LCD apparatus of claim 11, wherein:
at least one of the plural spacings has a first length edge, a second length edge and a slant width edge; and
the slant width edge is connected between the first length edge and the second length edge and has a projection onto the second electrode, and the projection of the slant width edge is approximately parallel to the substantially straight edge of the electrical-field modifying device.

17. An FFS LCD apparatus of claim 10, further comprising:
an insulating layer disposed between the first electrode and the second electrode and including one of an oxide and a nitride; and
an FFS structure including the first electrode and the second electrode, wherein the electrical-field modifying device is formed inside the second electrode and within the FFS structure,
wherein the plural spacings include one selected from a group consisting of a straight slit, a bending slit and a combination thereof;
the first electrode is a pixel electrode when the second electrode is a counter electrode;
the first electrode is a counter electrode when the second electrode is a pixel electrode;
each of the first and the second electrodes includes a transparent conductive material;
the electrical-field modifying device includes one selected from a group consisting of a penetrating hole, a penetrating cutout, an insulating area and a combination thereof; and
when the plural spacings include a bending slit, the bending slit has a bending angle in a range of 0.1 to 50 degrees.

18. An FFS LCD apparatus of claim 10, wherein:
the plural spacings include two outmost spacings;
the second electrode has an edge having a projection onto the first electrode, wherein the projection of the edge of the second electrode is disposed in one of places partially and entirely inside one of the two outmost spacings;
the one outmost spacing has two length edges; and
the electrical-field modifying device is a penetrating cutout including a substantially straight edge, which forms a segment of a contour of the penetrating cutout and has a projection onto the first electrode and across one of the two length edges of the one outmost spacing.

19. A fringe field switching (FFS) liquid crystal display (LCD) apparatus, comprising:
a first electrode including plural spacings defining plural strips, wherein each of the plural strips is formed between two of the plural spacings, and each of the plural spacings has two ends;
a second electrode disposed in a stacked relationship with the first electrode; and
at least an electrical-field modifying device having a projection overlapping one of the two ends of one of the plural spacings, wherein the plural spacings include two outmost spacings, the second electrode has an outmost edge forming a segment of a contour of the second electrode and having a projection onto the first electrode, and the projection of the outmost edge of the second electrode is disposed in one of places partially and entirely inside one of the two outmost spacings.

* * * * *